(12) United States Patent
Iscoe et al.

(10) Patent No.: US 11,386,318 B2
(45) Date of Patent: *Jul. 12, 2022

(54) MACHINE LEARNING BASED WEBINTERFACE PRODUCTION AND DEPLOYMENT SYSTEM

(71) Applicant: EVOLV TECHNOLOGY SOLUTIONS, INC., Belleville (BB)

(72) Inventors: Neil Iscoe, Austin, TX (US); Risto Miikkulainen, Stanford, CA (US)

(73) Assignee: EVOLV TECHNOLOGY SOLUTIONS, INC., San Francisco, CA (US)

(*) Notice: Subject to any disclaimer, the term of this patent is extended or adjusted under 35 U.S.C. 154(b) by 674 days.

This patent is subject to a terminal disclaimer.

(21) Appl. No.: 15/399,450

(22) Filed: Jan. 5, 2017

(65) Prior Publication Data

US 2017/0192638 A1 Jul. 6, 2017

Related U.S. Application Data

(60) Provisional application No. 62/275,074, filed on Jan. 5, 2016, provisional application No. 62/275,058, filed on Jan. 5, 2016.

(51) Int. Cl.
*G06N 3/04* (2006.01)
*G06F 16/26* (2019.01)
(Continued)

(52) U.S. Cl.
CPC ........... *G06N 3/04* (2013.01); *G06F 3/0484* (2013.01); *G06F 11/3664* (2013.01);
(Continued)

(58) Field of Classification Search
CPC .......... G06N 3/04; G06N 3/086; G06N 3/126; G06F 16/2379; G06F 16/958;
(Continued)

(56) References Cited

U.S. PATENT DOCUMENTS 4,935,877 A * 6/1990 Koza .................. G06N 3/126
706/13
5,136,686 A * 8/1992 Koza .................. G06N 3/126
706/13
(Continued)

FOREIGN PATENT DOCUMENTS

CN 103853656 A 6/2014
CN 104734918 A 6/2015
(Continued)

OTHER PUBLICATIONS

PCT/IB17/50043—International Search Report and Written Opinion dated May 24, 2017, 28 pages.
(Continued)

*Primary Examiner* — Jeremy L Stanley
(74) *Attorney, Agent, or Firm* — Haynes Beffel & Wolfeld LLP; Sikander M. Khan

(57) ABSTRACT

Roughly described, the technology disclosed provides a so-called machine learned conversion optimization (MLCO) system that uses evolutionary computations to efficiently identify most successful webpage designs in a search space without testing all possible webpage designs in the search space. The search space is defined based on webpage designs provided by marketers. Website funnels with a single webpage or multiple webpages are represented as genomes. Genomes identify different dimensions and dimension values of the funnels. The genomes are subjected to evolutionary operations like initialization, testing, competition, and procreation to identify parent genomes that perform well and offspring genomes that are likely to perform well. Each webpage is tested only to the extent that it is possible to decide whether it is promising, i.e., whether it should serve as a parent for the next generation, or should be discarded.

26 Claims, 20 Drawing Sheets

(51) Int. Cl.
| | |
|---|---|
| *G06F 16/23* | (2019.01) |
| *G06F 16/958* | (2019.01) |
| *G06Q 30/02* | (2012.01) |
| *G06F 40/143* | (2020.01) |
| *G06N 3/08* | (2006.01) |
| *G06F 3/0484* | (2022.01) |
| *G06F 11/36* | (2006.01) |
| *G06N 3/12* | (2006.01) |
| *G06F 9/451* | (2018.01) |
| *G06F 8/36* | (2018.01) |
| *G06N 3/06* | (2006.01) |

(52) U.S. Cl.
CPC ......... *G06F 16/2379* (2019.01); *G06F 16/26* (2019.01); *G06F 16/958* (2019.01); *G06F 40/143* (2020.01); *G06N 3/086* (2013.01); *G06N 3/126* (2013.01); *G06Q 30/02* (2013.01); *G06F 8/36* (2013.01); *G06F 9/451* (2018.02); *G06N 3/06* (2013.01)

(58) Field of Classification Search
CPC .... G06F 16/26; G06F 3/0484; G06F 11/3664; G06F 9/451; G06F 8/36; G06F 17/2247; G06F 40/143; G06Q 30/02
See application file for complete search history.

(56) References Cited

U.S. PATENT DOCUMENTS

| | | | | |
|---|---|---|---|---|
| 5,343,554 A * | 8/1994 | Koza | ...................... | G06N 3/126 706/13 |
| 5,568,590 A * | 10/1996 | Tolson | ...................... | G06T 11/60 706/13 |
| 5,761,381 A * | 6/1998 | Arci | ...................... | G06N 3/126 706/13 |
| 5,867,397 A * | 2/1999 | Koza | ...................... | G06F 17/50 703/14 |
| 5,970,487 A * | 10/1999 | Shackleford | ........... | G06N 3/126 706/13 |
| 6,088,690 A * | 7/2000 | Gounares | ............... | G06N 3/126 706/13 |
| 6,523,016 B1 * | 2/2003 | Michalski | .............. | G06N 3/126 706/12 |
| 6,957,200 B2 * | 10/2005 | Buczak | ................... | G06N 3/126 706/13 |
| 7,016,882 B2 * | 3/2006 | Afeyan | ................... | G06F 17/50 706/13 |
| 7,035,740 B2 * | 4/2006 | Kermani | .................. | G16B 40/00 702/19 |
| 7,047,169 B2 * | 5/2006 | Pelikan | ................... | G06N 3/126 703/2 |
| 7,353,184 B2 * | 4/2008 | Kirshenbaum | .... | G06Q 30/0204 705/7.33 |
| 7,356,518 B2 * | 4/2008 | Bonabeau | ............. | G06N 3/126 706/13 |
| 7,444,309 B2 * | 10/2008 | Branke | .................. | G06N 3/126 706/13 |
| 7,603,326 B2 * | 10/2009 | Bonabeau | ............. | G06N 3/126 706/13 |
| 7,624,077 B2 | 11/2009 | Bonabeau et al. | | |
| 7,707,220 B2 * | 4/2010 | Bonabeau | ............. | G06N 3/126 707/758 |
| 7,882,048 B2 * | 2/2011 | Bonabeau | ............. | G06N 3/126 706/13 |
| 8,117,139 B2 | 2/2012 | Bonabeau et al. | | |
| 8,117,140 B2 | 2/2012 | Bonabeau et al. | | |
| 8,423,323 B2 * | 4/2013 | Bonabeau | ............. | G06Q 10/06 703/1 |
| 3,775,341 A1 | 7/2014 | Commons | | |
| 8,775,341 B1 * | 7/2014 | Commons | ........... | G06N 3/0454 706/20 |
| 8,805,715 B1 * | 8/2014 | Jones | ..................... | G06Q 30/02 705/14.66 |
| 8,868,446 B2 * | 10/2014 | Lamoureux | ........... | G06Q 30/02 705/14.72 |
| 9,002,729 B2 * | 4/2015 | Natoli | ................ | G06Q 30/0202 705/14.4 |
| 9,008,416 B2 | 4/2015 | Movellan et al. | | |
| 9,104,978 B2 * | 8/2015 | Zeine | ..................... | G06N 20/00 |
| 9,311,383 B1 * | 4/2016 | Karty | .................. | G06Q 30/0251 |
| RE46,178 E * | 10/2016 | Afeyan | ................. | G06F 17/50 |
| 9,792,205 B2 * | 10/2017 | Young | ................. | G06F 11/3688 |
| 10,503,529 B2 * | 12/2019 | Lopushenko | ........... | G06F 9/454 |
| 2002/0082077 A1 * | 6/2002 | Johnson | .................. | A63F 13/12 463/30 |
| 2003/0191731 A1 * | 10/2003 | Stewart | .................... | G06N 5/02 706/47 |
| 2004/0024888 A1 * | 2/2004 | Davis | .................... | G06Q 30/02 709/229 |
| 2004/0025109 A1 * | 2/2004 | Harrington | ........... | G06Q 10/04 715/255 |
| 2004/0122785 A1 * | 6/2004 | Brown | .................... | G06F 8/427 706/16 |
| 2004/0143559 A1 * | 7/2004 | Ayala | .................... | G06N 3/086 706/13 |
| 2006/0103667 A1 * | 5/2006 | Amit | ..................... | G06F 17/211 345/619 |
| 2006/0225003 A1 * | 10/2006 | Agogino | ................. | G06F 17/50 716/102 |
| 2007/0094072 A1 * | 4/2007 | Vidals | ................... | G06Q 30/02 705/14.43 |
| 2007/0094168 A1 * | 4/2007 | Ayala | .................... | G06N 3/105 706/15 |
| 2007/0100688 A1 * | 5/2007 | Book | ................. | G06Q 30/0254 705/14.52 |
| 2007/0239632 A1 * | 10/2007 | Burges | .................. | G06N 20/00 706/15 |
| 2007/0298866 A1 * | 12/2007 | Gaudiano | ............... | A63F 13/00 463/23 |
| 2007/0300185 A1 * | 12/2007 | Macbeth | ................. | G06F 9/451 715/825 |
| 2008/0027924 A1 * | 1/2008 | Hamilton | ............ | G06F 16/9535 |
| 2008/0082362 A1 | 4/2008 | Haider | | |
| 2008/0209320 A1 * | 8/2008 | Mawhinney | ........ | G06F 16/9535 715/700 |
| 2008/0275980 A1 * | 11/2008 | Hansen | ................... | G06Q 30/02 709/224 |
| 2009/0030859 A1 * | 1/2009 | Buchs | ................... | G06F 16/957 706/19 |
| 2009/0125370 A1 * | 5/2009 | Blondeau | .............. | G06F 9/5066 |
| 2009/0259534 A1 * | 10/2009 | Utter | ..................... | G06Q 20/10 705/14.1 |
| 2009/0327913 A1 * | 12/2009 | Adar | ..................... | G06F 16/955 715/745 |
| 2010/0169234 A1 * | 7/2010 | Metzger | ............... | G06Q 10/067 705/348 |
| 2011/0179370 A1 * | 7/2011 | Cardno | .................. | G06T 11/206 715/771 |
| 2011/0214077 A1 * | 9/2011 | Singh | ..................... | G06F 9/451 715/762 |
| 2011/0261049 A1 * | 10/2011 | Cardno | .................. | G06Q 10/10 345/419 |
| 2012/0022938 A1 * | 1/2012 | McNea | .................. | G06Q 30/01 705/14.42 |
| 2012/0089544 A1 | 4/2012 | Zeine et al. | | |
| 2012/0130929 A1 * | 5/2012 | Cantin | .................. | G06N 3/086 706/13 |
| 2012/0303564 A1 * | 11/2012 | Dobson | .................. | G06N 3/08 706/21 |
| 2013/0024290 A1 * | 1/2013 | Berg | .................... | G06Q 30/0201 705/14.66 |
| 2013/0124440 A1 * | 5/2013 | Hodjat | .................... | G06N 3/126 706/13 |
| 2013/0179434 A1 * | 7/2013 | Sanghavi | ........... | G06Q 30/0241 707/719 |
| 2013/0218821 A1 * | 8/2013 | Szatmary | ................. | G06N 3/10 706/25 |
| 2013/0254036 A1 * | 9/2013 | Trinh | ................... | G06Q 30/0251 705/14.64 |

(56) References Cited

U.S. PATENT DOCUMENTS

| | | | | |
|---|---|---|---|---|
| 2013/0282626 | A1* | 10/2013 | White | G06Q 30/0201 706/11 |
| 2014/0067514 | A1* | 3/2014 | Vitti | G06Q 30/0236 705/14.36 |
| 2014/0067516 | A1* | 3/2014 | Price | G06Q 30/0222 705/14.39 |
| 2014/0075004 | A1* | 3/2014 | Van Dusen | H04L 41/04 709/223 |
| 2014/0075336 | A1* | 3/2014 | Curtis | G06F 3/0481 715/753 |
| 2014/0189714 | A1* | 7/2014 | Lawbaugh | H04L 41/0253 719/313 |
| 2014/0236875 | A1* | 8/2014 | Phillipps | G06Q 30/0202 706/12 |
| 2014/0279203 | A1* | 9/2014 | Malek | G06Q 30/0631 705/26.7 |
| 2014/0321737 | A1* | 10/2014 | Movellan | G06K 9/00302 382/159 |
| 2014/0344013 | A1* | 11/2014 | Karty | G06Q 30/0201 705/7.29 |
| 2014/0372344 | A1* | 12/2014 | Morris | G06N 20/00 706/11 |
| 2015/0006442 | A1* | 1/2015 | Ogilvie | G06Q 50/01 706/12 |
| 2015/0019173 | A1* | 1/2015 | Amid | G06F 17/50 703/1 |
| 2015/0039416 | A1* | 2/2015 | Sullivan | G06Q 30/0276 705/14.43 |
| 2015/0074641 | A1* | 3/2015 | Nambiar | G06F 8/20 717/121 |
| 2015/0095756 | A1* | 4/2015 | Aganovic | G06F 17/2247 715/234 |
| 2015/0254328 | A1* | 9/2015 | Dereszynski | G06Q 30/0277 707/739 |
| 2015/0363302 | A1* | 12/2015 | Young | H04W 4/18 717/130 |
| 2016/0269237 | A1* | 9/2016 | Higgins | H04W 12/08 |
| 2016/0321716 | A1* | 11/2016 | Ravikant | G06Q 30/0601 |
| 2017/0124600 | A1* | 5/2017 | Katzen | G06Q 30/0277 |
| 2017/0132553 | A1* | 5/2017 | Theirl | G06F 16/26 |
| 2017/0193366 | A1 | 7/2017 | Miikkulainen et al. | |
| 2017/0193367 | A1 | 7/2017 | Miikkulainen et al. | |
| 2017/0300966 | A1* | 10/2017 | Dereszynski | G06Q 30/0254 |
| 2019/0205020 | A1* | 7/2019 | Fairbanks | G11B 27/034 |

FOREIGN PATENT DOCUMENTS

| | | | |
|---|---|---|---|
| JP | 2003-529116 A | 9/2003 | |
| WO | 2000002138 A1 | 1/2000 | |
| WO | WO-2000058878 | * 10/2000 | G06Q 30/02 |

OTHER PUBLICATIONS

PCT/IB17/50044—International Search Report and Written Opinion dated Jun. 1, 2017, 21 pages.

"It's All A/Bout Testing: The Netflix Experimentation Platform", Apr. 29, 2016, 9 pages, [Retrieved Oct. 4, 2016]. Retrieved from the Internet <URL: http://techblog.netflix.com/2016/04/itsallabout-testingnetflix.html>.

"Look Inside a 1,024 Recipt Multivariate Experiment", Aug. 13, 2009, 3 pages.

"Product Integration Testing at the Speed of Netflix", Jul. 5, 2016, 12 pages, [Retrieved Oct. 4, 2016]. Retrieved from the Internet <URL: http://techblog.netflix.com/search/label/A%2FB%20Testing>.

Nesamoney, Diaz, "Personalized Digital Advertising", 2015, cover page through p. 6 and Index, 34 pages.

Saint-Amant, Chris, "Netflix Scaling A/B Testing on Netflix.com with Node.js", Aug. 18, 2014, 8 pages.

U.S. Appl. No. 15/399,433—Office Action dated Aug. 30, 2018, 29 pages.

Shrivastava, et al., "A Reviewon Web Recommendation System", International Journal of Computer Applications (0975-8887) vol. 83-No. 17, Dec. 2013, pp. 14-17.

PCT/IB17/050044—International Preliminary Report on Patentability dated Jul. 19, 2018, 11 pages.

PCT/IB17/050043—International Preliminary Report on Patentability dated Jul. 19, 2018, 8 pages.

EP 17735902.3—Voluntary Amendments filed Feb. 18, 2019, 20 pages.

EP 17735903.1—Voluntary Amendments filed Feb. 15, 2019, 22 pages.

U.S. Appl. No. 15/399,433—Preliminary Amendment dated Jan. 3, 2018, 7 pages.

U.S. Appl. No. 15/399,433—Response to Office Action dated Aug. 30, 2018, filed Feb. 28, 2019, 11 pages.

U.S. Appl. No. 15/399,433—Notice of Allowance dated Apr. 3, 2019, 19 pages.

CN 201780015049.6—Voluntary Amendment filed Apr. 26, 2019, 20 pages.

EP 17735902.3—Search Report dated Aug. 2, 2019, 10 pages.

Tamburrelli et al., "Towards Automated A/B Testing", Aug. 26, 2014, International Conference on Computer Analysis of Images and Patterns. CAIP 2017: Computer Analysis of Images and Patterns; [Lecture notes in Computer Science; Lect.Notes Computer], Springer, Berlin, Heidelberg, pp. 184-198, XP047297313, ISBN: 978-3-642-17318-9.

EP 17735903.1—Search Report dated Aug. 2, 2019, 12 pages.

U.S. Appl. No. 15/399,520—Office Action dated Nov. 15, 2019, 13 pages.

U.S. Appl. No. 15/399,523—Notice of Allowance dated Jan. 10, 2020, 23 pages.

EP 17735902.3—Response to Rule 70(2) and Search Report dated Aug. 21, 2019 filed Feb. 6, 2020, 19 pages.

IL 260372—First Office Action dated Feb. 23, 2020, 4 pages.

U.S. Appl. No. 15/399,523—Notice of Allowance dated May 20, 2020, 19 pages.

U.S. Appl. No. 15/399,520—Response to Office Action dated Nov. 15, 2019, filed Feb. 13, 2020, 8 pages.

U.S. Appl. No. 15/399,520—Notice of Allowance dated May 28, 2020, 10 pages.

Baveye, "Automatic Prediction of Emotions Induced by Movies", Doctoral Thesis, University of Lyon, 2015, pp. 1-162.

U.S. Appl. No. 15/399,520—Notice of Allowance dated Oct. 16, 2020, 20 pages.

CN 201780015049.6—First Office Action dated Aug. 17, 2020, 9 pages (including 4 pages of English translation).

CN 201780015049.6—Response to First Office Action filed Dec. 31, 2020, 15 pages (including 6 pages of English translation).

Giordano Tamburrelli et al., "Towards Automated A/B Testing", ResearchGate, Aug. 4, 2014, https://www.researchgate.net/publication/264435539, retrieved on Feb. 3, 2021, 16 pages.

JP 2018-553336, First Office Action dated Feb. 24, 2021, 8 pages.

IL 260372—Response to First Office Action dated Feb. 23, 2020 filed Jun. 21, 2020, 46 pages.

IL 260372—Notice of Allowance dated Dec. 20, 2020, 8 pages.

U.S. Appl. No. 15/399,520—Notice of Allowance dated Mar. 9, 2021, 11 pages.

CN 201780015049.6—Notice of Allowance, dated Apr. 7, 2021, 4 pages.

JP 2018-553336 Response to First Office Action dated Feb. 24, 2021, filed Aug. 24, 2021, 11 pages.

AU 2017205231—First Examination Report dated Jun. 23, 2021, 5 pages.

JP 2018-553336 Notice of Allowance, dated Oct. 26, 2021, 5 pages.

* cited by examiner

FIRST GENERATION INITIALIZATION

| Logo | Main Headline | Sub Headline | Action Button | |
|---|---|---|---|---|
| [[[1, 0], | [1, 0, 0, 0]], | [[1, 0, 0, 0, 0, 0]], | [[[1, 0], | [1, 0]]], |
| [[0, 1], | [1, 0, 0, 0]], | [[1, 0, 0, 0, 0, 0]], | [[1, 0], | [1, 0]]], |
| [[1, 0], | [0, 1, 0, 0]], | [[1, 0, 0, 0, 0, 0]], | [[1, 0], | [1, 0]]], |
| [[1, 0], | [0, 0, 1, 0]], | [[1, 0, 0, 0, 0, 0]], | [[1, 0], | [1, 0]]], |
| [[1, 0], | [0, 0, 0, 1]], | [[1, 0, 0, 0, 0, 0]], | [[1, 0], | [1, 0]]], |
| [[1, 0], | [1, 0, 0, 0]], | [[0, 1, 0, 0, 0, 0]], | [[1, 0], | [1, 0]]], |
| [[1, 0], | [1, 0, 0, 0]], | [[0, 0, 1, 0, 0, 0]], | [[1, 0], | [1, 0]]], |
| [[1, 0], | [1, 0, 0, 0]], | [[0, 0, 0, 1, 0, 0]], | [[1, 0], | [1, 0]]], |
| [[1, 0], | [1, 0, 0, 0]], | [[0, 0, 0, 0, 1, 0]], | [[1, 0], | [1, 0]]], |
| [[1, 0], | [1, 0, 0, 0]], | [[0, 0, 0, 0, 0, 1]], | [[1, 0], | [1, 0]]], |
| [[1, 0], | [1, 0, 0, 0]], | [[1, 0, 0, 0, 0, 0]], | [[0, 1], | [1, 0]]], |
| [[1, 0], | [1, 0, 0, 0]], | [[1, 0, 0, 0, 0, 0]], | [[1, 0], | [1, 0]]], } Starter Genome 922
| [[1, 0], | [1, 0, 0, 0]], | [[1, 0, 0, 0, 0, 0]], | [[0, 1], | [1, 0]]], |
| [[1, 0], | [1, 0, 0, 0]], | [[1, 0, 0, 0, 0, 0]], | [[1, 0], | [0, 1]]], |

FIG. 10

CONTROL INDIVIDUAL & WINNING INDIVIDUAL

Control banner

Best performer

MACHINE LEARNING BASED WEBINTERFACE PRODUCTION AND DEPLOYMENT SYSTEM

CROSS REFERENCE TO OTHER APPLICATIONS

This application claims the benefit of U.S. Provisional Patent Application 62/275,058, "AUTOMATED CONVERSION OPTIMIZATION SYSTEM AND METHOD USING MACHINE LEARNING", filed on Jan. 5, 2016. The priority provisional application is hereby incorporated by reference;

This application claims the benefit of U.S. Provisional Patent Application 62/275,074, "AUTOMATED SEGMENTATION/PERSONALIZATION CONVERSION OPTIMIZATION USING MACHINE LEARNING", filed on Jan. 5, 2016. The priority provisional application is hereby incorporated by reference;

This application incorporates by reference U.S. Nonprovisional Patent Application No. 15/399,433 entitled "MACHINE LEARNING BASED WEBINTERFACE GENERATION AND TESTING SYSTEM", filed Jan. 5, 2017;

This application incorporates by reference U.S. Nonprovisional Patent Application No. 15/399,520 entitled "WEBINTERFACE GENERATION AND TESTING USING ARTIFICIAL NEURAL NETWORKS", filed Jan. 5, 2017; and This application incorporates by reference U.S. Nonprovisional Patent Application No. 15/399,523 entitled "WEBINTERFACE PRODUCTION AND DEPLOYMENT USING ARTIFICIAL NEURAL NETWORKS", filed Jan. 5, 2017.

FIELD OF THE TECHNOLOGY DISCLOSED

The technology disclosed relates generally to webinterface generation and testing using artificial intelligence, and in particular relates to providing so-called machine learned conversion optimization (MLCO) solutions using evolutionary computations.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The technology disclosed provides a so-called machine learned conversion optimization (MLCO) system that uses evolutionary computations to efficiently identify most successful webpage designs in a search space without testing all possible webpage designs in the search space. The search space is defined based on webpage designs provided by marketers. Website funnels with a single webpage or multiple webpages are represented as genomes. Genomes identify different dimensions and dimension values of the funnels. The genomes are subjected to evolutionary operations like initialization, testing, competition, and procreation to identify parent genomes that perform well and offspring genomes that are likely to perform well. Each webpage is tested only to the extent that it is possible to decide whether it is promising, i.e., whether it should serve as a parent for the next generation, or should be discarded.

Common methods for running controlled experiments on websites include sophisticated conversion optimization solutions. Conversion optimization includes testing multiple combinations and variations of webpages and page elements at the same time. For example, two alternative images, plus two alternative headlines, plus two copy text alternatives, for a total of twenty-seven possible combinations (including the original control versions) may be provided. Thus, conversion optimization introduces a rather complex set of permutations and combinations that need to be analyzed to determine the most effective combination of page elements that truly engage the users.

As Big Data plays a more important role in web personalization, the number of data signals, the complexity of rules, and the sheer number of outcomes has increased exponentially. As that happens, human optimization simply cannot be done except perhaps after the fact, where there is little to no opportunity to impact the outcome. Algorithmic optimization is required, but even there, simple linear regression algorithms that can handle linear relationships and correlations may not be able to sufficiently create improved outcomes, given the vast number of data inputs and resulting measurements that have to be processed to predict performance.

Machine learning systems are utilized to run tests where many variables with very complex relationships between them are involved in determining outcomes. Machine learning systems typically attempt to learn from the data to figure out the formula, rather than to try to figure out a formula to begin with, given that the relationships between the variables may be too complex to determine the algorithm in advance. Therefore, with so many variables at play in conversion optimization, very sophisticated algorithms are desirable that utilize machine learning, artificial intelligence, and other non-linear algorithms to make predictions about outcomes based on learning from large data sets of inputs.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 10 depicts one implementation of initializing a first generation based on a starter funnel.

DETAILED DESCRIPTION

Figure 1:
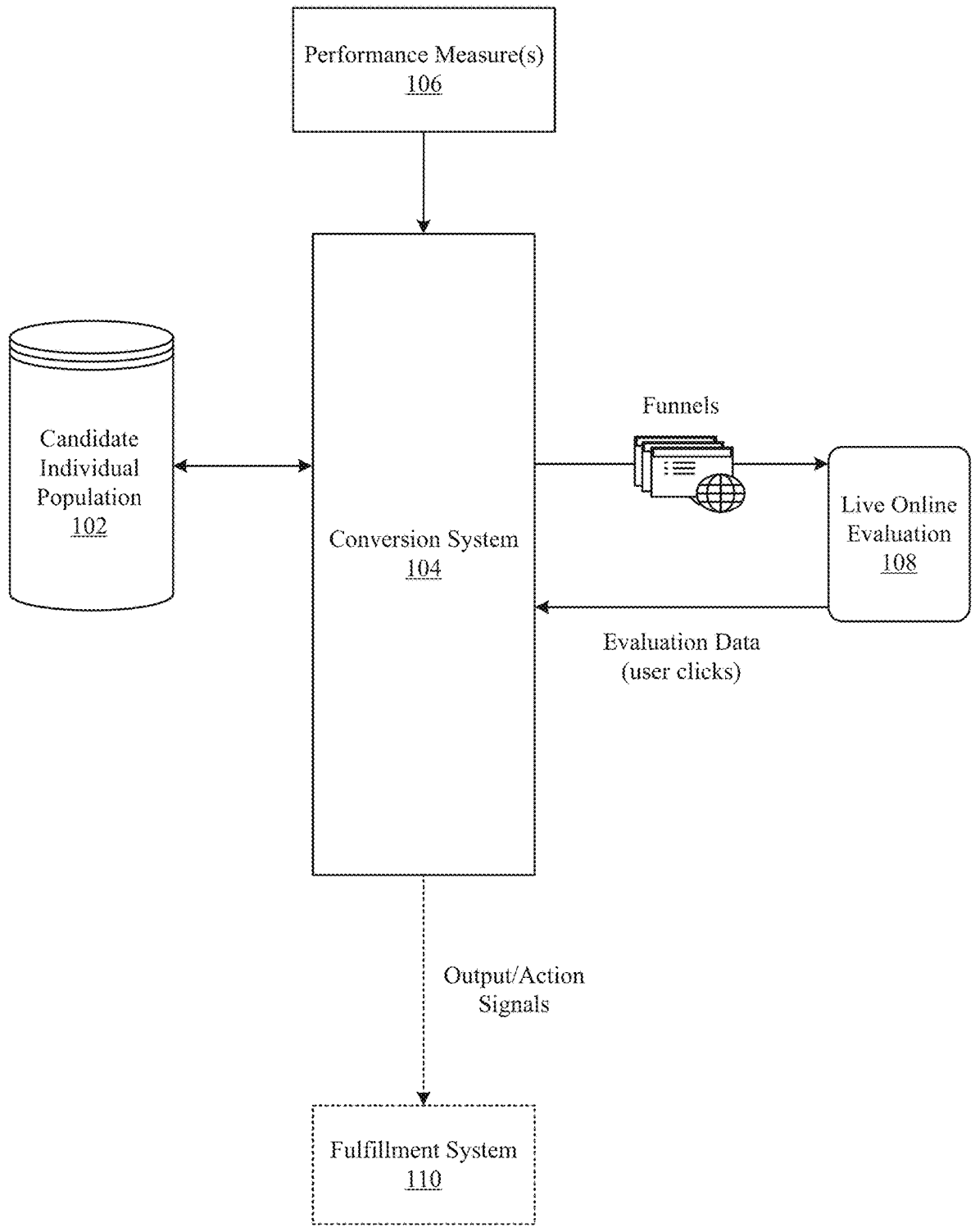
FIG. 1 depicts a conversion system that implements evolutionary computations to identify high performing candidate individuals in a candidate search space.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Examples of systems, apparatus, and methods according to the disclosed implementations are described in a conversion optimization context. In other instances, the technology disclosed can be applied to multivariate testing, A/B testing, landing page optimization, conversion rate optimization, website testing, website optimization, search engine optimization, information technology, telecommunications systems, financial systems, security trading, banking, business intelligence, marketing, medical and health sciences, mining, energy, etc. Other services are possible, such that the following examples should not be taken as definitive or limiting either in scope, context, or setting.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a Big-Table™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™ and Yahoo! S4™.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify".

As used herein, a given signal, event or value is "in dependence upon" a predecessor signal, event or value of the predecessor signal, event or value influenced by the given signal, event or value. If there is an intervening processing element, step or time period, the given signal, event or value can still be "in dependence upon" the predecessor signal, event or value. If the intervening processing element or step combines more than one signal, event or value, the signal output of the processing element or step is considered "in dependence upon" each of the signal, event or value inputs. If the given signal, event or value is the same as the predecessor signal, event or value, this is merely a degenerate case in which the given signal, event or value is still considered to be "in dependence upon" or "dependent on" or "based on" the predecessor signal, event or value. "Responsiveness" of a given signal, event or value upon another signal, event or value is defined similarly.

As used herein, "concurrently" or "in parallel" does not require exact simultaneity. It is sufficient if the evaluation of one of the individuals begins before the evaluation of another of the individuals completes.

As used herein, the term "funnel" refers to a frontend of a candidate individual, which is perceivable, operable, and understandable by end users. In implementations, a funnel invites user interaction and responds to it. A funnel comprises one or more webinterfaces. Some examples of webinterfaces include, both control versions and variations of, webpages, websites, e-mails, mobile applications, desktop applications, digital advertisements, social media messages (e.g., Tweet™, Facebook Post™), social media feed items, social media profiles, social media accounts, social media chat messages, generic chat messages, forms, auto-filled forms, and so on. In some implementations a funnel can include branching.

In implementations of the technology disclosed, a funnel is implemented in or across one or more Internet accessible data centers such as a website (a set of funnels), together with associated applications running behind the website. End users operate Internet-accessible client devices or clients (e.g., desktop computers, notebook computers, tablets, mobile devices, phones or other devices having rendering engines, or the like) that are capable of accessing and interacting with the funnel. In one implementation, the end users access the funnel by opening a web browser or a mobile application. In some implementations, the end users may authenticate to the funnel (or some portion thereof).

In implementations of the technology disclosed, a webinterface is a structured document whose structure is dependent upon the underlying format. For example, in one implementation, a webinterface has a web-supported format based on Hyper Text Markup Language (HTML), Extensible Markup Language (XML), or other web-supported structured document. The webinterface may include one or more resources (e.g., a JavaScript resource, a Cascading Style Sheet (CSS) resource, an Asynchronous and JavaScript XML (AJAX) resource, an image resource, a video resource, etc.), or, more typically, references to such resources, embedded within the webinterface. By way of example, a resource embedded in the web interface may generally be included or specified within a script element, style element, image element, or object element, among others, depending on the type of resource. Typically, a web browser or other client application executing at the client device of the end user constructs a document object model (DOM) representation of the received web interface.

In another implementation, the webinterface has an e-mail format based on plain text, rich text, or HTML (with or without a style definition format such as CSS or scripting instructions in a format such as JavaScript, e.g., Microsoft Outlook™, Google Gmail™, Apple Mail™, iOS Mail™, Thunderbird™, AOL Mail™, Yahoo Mail™, Windows Live™). In yet other implementations, the webinterface has a mobile application format based on HTML5, native formats (e.g., iOS™ or Android™), and hybrid formats.

Any other conventional or future-developed structured documents or formats thereof or used therein, are considered to be webinterfaces. Such implementations will be readily apparent to those skilled in the art without departing from the spirit and scope of the technology disclosed (such as audio and haptic presentations of webinterfaces).

The webinterface (e.g., webpages, websites, e-mails, mobile applications, desktop applications, digital advertisements) comprises page elements. Some examples of page elements include images, videos, animations, headline, heading, calls-to-action, text copies, form length, and others. In one example, the calls-to-action define what happens when a user clicks or taps on any part of the webinterface. The page elements of the webinterface are arranged in a so-called webinterface layout. A webinterface layout defines the positioning of the page elements of the webinterface relative to each other. For example, an image might be at the bottom right and a video in the center of the webinterface layout. In the webinterface, all the interchangeable page elements are described using the webinterface layout, which describes how the page elements are supposed to appear relative to each other and how they are supposed to interact with each other. Each page element has several properties. For example, image page elements have properties related to type, placement, and size; calls-to-action have properties related to color, text, size, and placement; and text copies have properties related to content, length, and size.

As used herein, the terms "funnel(s)", "candidate individual(s)", "individual(s)", "genome(s)", and "chromosome(s)" are used interchangeably. Also, "individual(s)", "genome(s)", and "chromosome(s)" are composed of gene(s) and/or "gene value(s)". As used herein, the term "gene(s)" and/or "gene value(s)" can refer to a different "entity" and/or different "entities" such as cluster(s) or page element(s) or dimension(s) or starter dimension(s), page element value(s) or element value(s) or dimension value(s) or start dimension value(s) or value(s), sub-sequence(s), sub-element(s) or control sub-element(s) or test sub-element(s), sub-element value(s) or control sub-element value(s) or test sub-element values, or any combinations thereof. Accordingly, as used herein, "gene-by-gene" operations or operations conducted or carried out at the "gene-level", such as gene-by-gene selection, gene-by-gene crossover, or gene-by-gene mutation can treat a single entity as a single unit to select, to crossover, and/or to mutate and/or or a combination of entities as a single unit to select, to crossover, and/or to mutate.

Introduction

The technology disclosed provides a so-called machine learned conversion optimization (MLCO) system that uses evolutionary computations to efficiently identify most successful webpage designs in a search space without testing all possible webpage designs in the search space. The search space is defined based on webpage designs provided by marketers. Website funnels with a single webpage or multiple webpages are represented as genomes. Genomes identify different dimensions and dimension values of the funnels. The genomes are subjected to evolutionary operations like initialization, testing, competition, and procreation to identify parent genomes that perform well and offspring genomes that are likely to perform well. Each webpage is tested only to the extent that it is possible to decide whether it is promising, i.e., whether it should serve as a parent for the next generation, or should be discarded.

In ecommerce, designing user experiences, i.e., webpages and interactions, which convert as many end users as possible from casual browsers to paying customers is an important goal. While there are some well-known design principles, including simplicity and consistency, there are also often unexpected interactions between elements of the page that determine how well it converts. The same element may work well in one context but not in others—it is often hard to predict the result, and even harder to decide how to improve a given page.

An entire industry has emerged to tackle these challenges; it is called conversion rate optimization, or conversion science. The standard method most practitioners use is AB testing, i.e., designing two different version of the same page, showing them to different users, and collecting statistics on how well they each convert. This process allows incorporating human knowledge about the domain and conversion optimization into the design, and then testing their effect. After observing the results, new designs can be compared and gradually improved. The A/B testing process is difficult and time-consuming: Only a very small fraction of page designs can be tested in this way, and subtle interactions in the design may simply be missed completely.

The technology disclosed automatically generates webpage candidates to be tested from the variables and variable values marketers themselves create. The variables and variable values can be anything on a website, from small changes like button color and font weight to whole-scale messaging and design specifications. These variables can all be on a single page or across multiple pages in a funnel. The technology disclosed searches for the most successful variables and variable values in a vast space of possible combinations of the values.

With the technology disclosed, thousands of page designs can be tested in a short time, which is impossible through A/B testing. On the other hand, through evolutionary search, the technology disclosed tests only a small subset (e.g., thousands) of page designs out of a much larger set of page designs (e.g., millions) to find the best ones. The technology disclosed learns over time which combinations of elements are effective, and gradually focuses the search around the most promising designs.

The technology disclosed is an automated system for conversion optimization, capable of testing vastly more ideas in shortened time frames. It finds the subtle combinations of variables that lead to conversion increases. The technology disclosed can discover designs that convert better than those designed by humans, often because it finds unexpected interactions between elements. For instance, the technology disclosed can find that the button needs to be green, but only when it is transparent and the header is in small font and the header text is aligned. Such interactions often do exist, and they can be very difficult to find. The technology disclosed makes this discovery process automatic, based on artificial intelligence, instead of extensive human effort. With the technology disclosed, it is thus possible to optimize conversions better and at a much larger scale than before—and keep optimizing them as the e-commerce conditions change.

Machine Learned Conversion Optimization (MLCO) System

FIG. 1 depicts a conversion system 104 that implements evolutionary computations to identify high performing candidate individuals in a candidate search space. The conversion system 104 does so by perpetually collecting and developing performance measures 106 for candidate individuals in the candidate individual population 102. The conversion system 104 also uses a presentation generator to transform the candidate individuals into funnels of one or more webinterfaces. The funnels are presented to end users during live online evaluation 108 so that the performance measures 106 can be developed for the corresponding candidate individuals based on evaluation data (e.g., user clicks) provided by the end users.

Each funnel has a mechanism by which achievement of a target user behavior can be detected. In one implementation, the target user behavior is conversion by end users. For each funnel, conversion can be detected based on a conversion goal defined by a designer, marketer, advertiser, or content creator. Examples of a conversion goal include a user reaching a specific webinterface of a funnel (e.g., a thank you page), a user clicking a link or button or other user interface element on a webinterface of a funnel, or any other custom event defined by the designer (e.g., using jQuery). Other examples of a conversion goal include a user clicking a "Buy Now" button on Amazon.com™, a user clicking a "Sign Up" button on an e-mail registration page, a user clicking a "Download Now" button on an application landing page, a user filling out a form to download a report, a user signing up for a webinar, a user completing a purchase process, a user adding an item to a shopping cart, a user initializing a shopping cart checkout, and a user making a pledge to read a book. The conversion goals can be different for different funnels and different testing environments.

The conversion system 104 operates according to the performance measures 106, which indicate to the conversion system 104 how to measure the fitness of a candidate individual. The conversion system 104 optimizes for candidate individuals that have the greatest fitness, however fitness is defined by the performance measures 106. The performance measures 106 are an indication of success of a candidate individual and corresponding funnel in achieving a target user behavior. The performance measures 106 are specific to the environment and goals of the particular application. In a webpage testing environment, for example, the performance measures 106 can be a function of a conversion goal defined for a funnel. In one implementation, the performance measures 106 are based on a "conversion rate". Conversion rate is a ratio of end users who visit a funnel and complete the conversion goal defined for the funnel (i.e., what percentage of the visitors complete the conversion goal). For example, a website with 5000 visitors and 50 conversions has a conversion rate of 1%. In another implementation, the performance measures 106 are based on a "revenue rate". Revenue rate is a revenue amount (e.g., numerical dollar value) generated per end user as a result of the end users completing the conversion goal defined for the funnel.

Regarding the live online evaluation 108, "live online evaluation" means real time tests or trials where funnels constructed in dependence upon the candidate individuals are presented to real world end users for testing. During the live online evaluation 108, the performance measures 106 are developed for each of the candidate individuals based on the real time and real world user interaction with the corresponding funnels. Typically, for each funnel, the performance measures 106 are determined over a sample of end users (e.g., 1000 end users or 2000 end users, and so on). Note that the performance measures 106 calculated based on the performance of the funnels during the live online evaluation 108 are associated with or linked to or assigned to the corresponding candidate individuals originally used to generate the funnels. After that, the performance measures 106 are used by the disclosed evolutionary computations to procreate high performing individuals.

The conversion system 104 interacts with a database containing the candidate individual population 102. As used herein, the term "database" does not necessarily imply any unity of structure. For example, two or more separate databases, when considered together, still constitute a "database" as that term is used herein. In some implementations, the database can store information from one or more tenants into tables of a common database image to form an on-demand database service (ODDS), which can be implemented in many ways, such as a multi-tenant database system (MTDS). A database image can include one or more database objects. In other implementations, the database can be a relational database management system (RDBMS), object oriented database management system (OODBMS), distributed file system (DFS), no-schema database, or any other data storing system or computing device.

In one implementation, the candidate individuals in population 102 are stored and managed by conventional database management systems (DBMS), and are accessed using SQL statements. Thus, a conventional SQL query can be used to obtain, for example, the performance measures 106 of the candidate individuals. New candidate individuals can be inserted into the population 102 using the SQL "insert" statement, and candidate individuals being discarded can be deleted using the SQL "delete" statement. In another implementation, the candidate individuals in population 102 are stored in a linked list. In such an implementation, insertion of a new candidate individual can be accomplished by writing its contents into an element in a free list, and then linking the element into the main linked list. Discarding of candidate individuals involves unlinking them from the main linked list and re-linking them into the free list.

In some implementations, the MLCO system uses an optional fulfillment system 110. Fulfillment system 110 is a system that is controlled automatically by output/action signals from the conversion system 104. In a webpage testing environment, for example, the fulfillment system 110 is a product distribution e-warehouse (e.g., Amazon.com™)

that receives the signals via a computer network (not shown) and takes appropriate transactional and delivery actions.

The discussion now turns to the evolutionary computations implemented by the MLCO system of FIG. 1.

Evolutionary Computations

Figure 2:
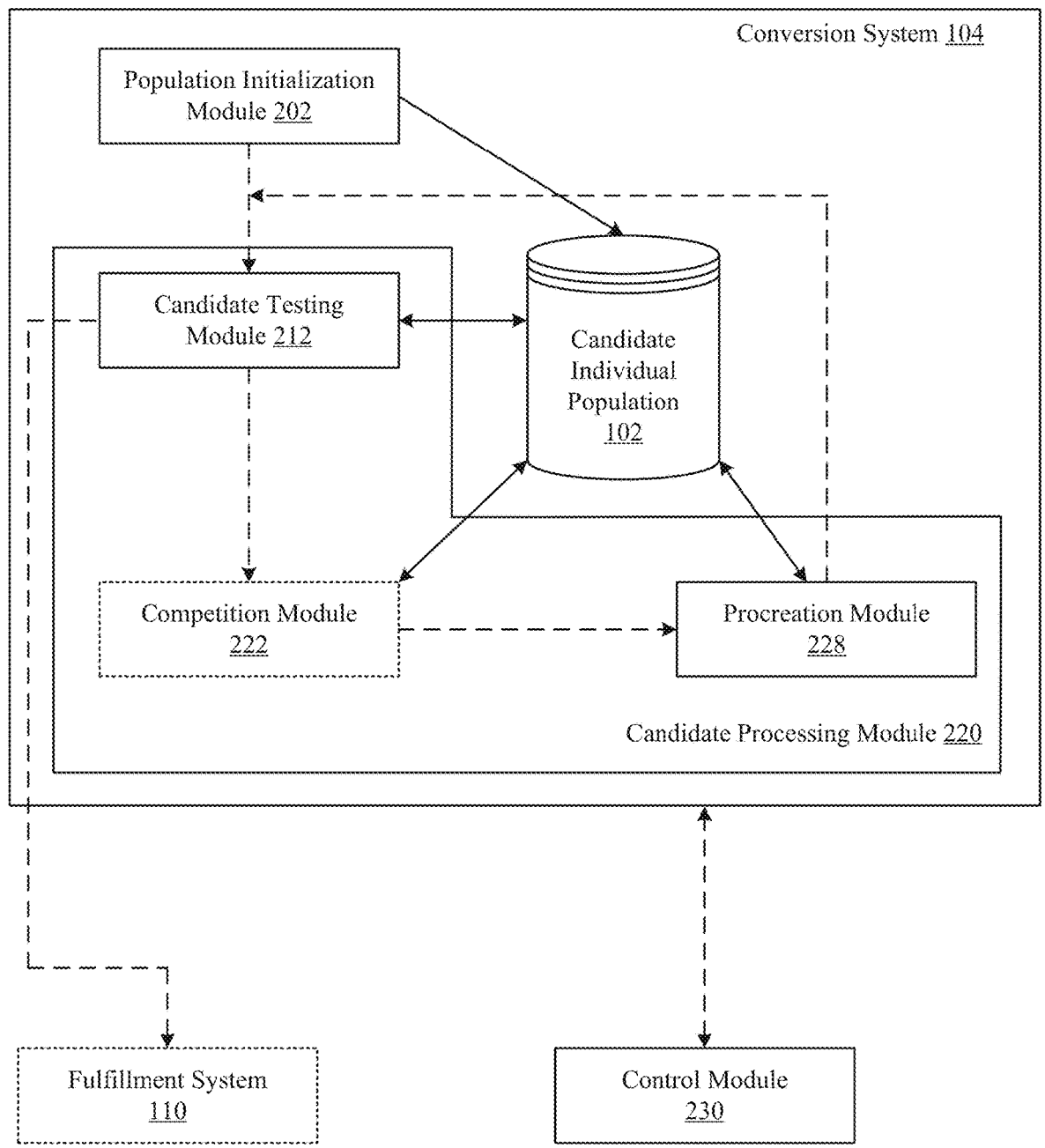
FIG. 2 illustrates modules that can be used to implement the evolutionary computations of the conversion system in FIG. 1.

FIG. 2 illustrates modules that can be used to implement the evolutionary computations of the conversion system 104 in FIG. 1. In FIG. 2, solid lines indicate data flow, broken lines indicate control flow, and dotted lines indicate optional modules. The modules in FIG. 2 can be implemented in hardware or software, and need not be divided up in precisely the same blocks as shown in FIG. 2. Some of the modules can also be implemented on different processors or computers, or spread among a number of different processors or computers. In addition, it will be appreciated that some of the modules can be combined, operated in parallel or in a different sequence than that shown in FIG. 2 without affecting the functions achieved. Also as used herein, the term "module" can include "sub-modules", which themselves can be considered herein to constitute modules. In particular, candidate testing module 212, competition module 222, and procreation module 228 are also considered herein to be sub-modules of a candidate processing module 220. The blocks in FIG. 2, designated as modules, can also be thought of as flowchart steps in a method. A module also need not necessarily have all its code disposed contiguously in memory; some parts of the code can be separated from other parts of the code with code from other modules or other functions disposed in between.

Population Initialization

Referring to FIG. 2, the candidate individual population 102 is initialized by a population initialization module 202, which writes a preliminary pool of candidate individuals in the population 102. The preliminary pool can be created randomly, or in some implementations, a priori knowledge can be used to seed the first generation. In another implementation, candidate individuals from prior runs can be borrowed to seed a new run. At the start, all candidate individuals are initialized with performance measures 106 that are indicated as undefined.

The population initialization module 202 also defines a candidate search space. As used herein, the term "candidate search space" refers to a space having M dimensions, where each dimension represents an axis along which different candidate individuals can have different values. The size of the space in each dimension is equal to the range of values available for that dimension.

The following discussion describes how a starter funnel is defined by a designer, marketer, advertiser, or content creator using a design editor. Once defined, the starter funnel is used by the population initialization module 202 to define the candidate search space and seed the first generation.

Starter Funnel Definition

Figure 3:
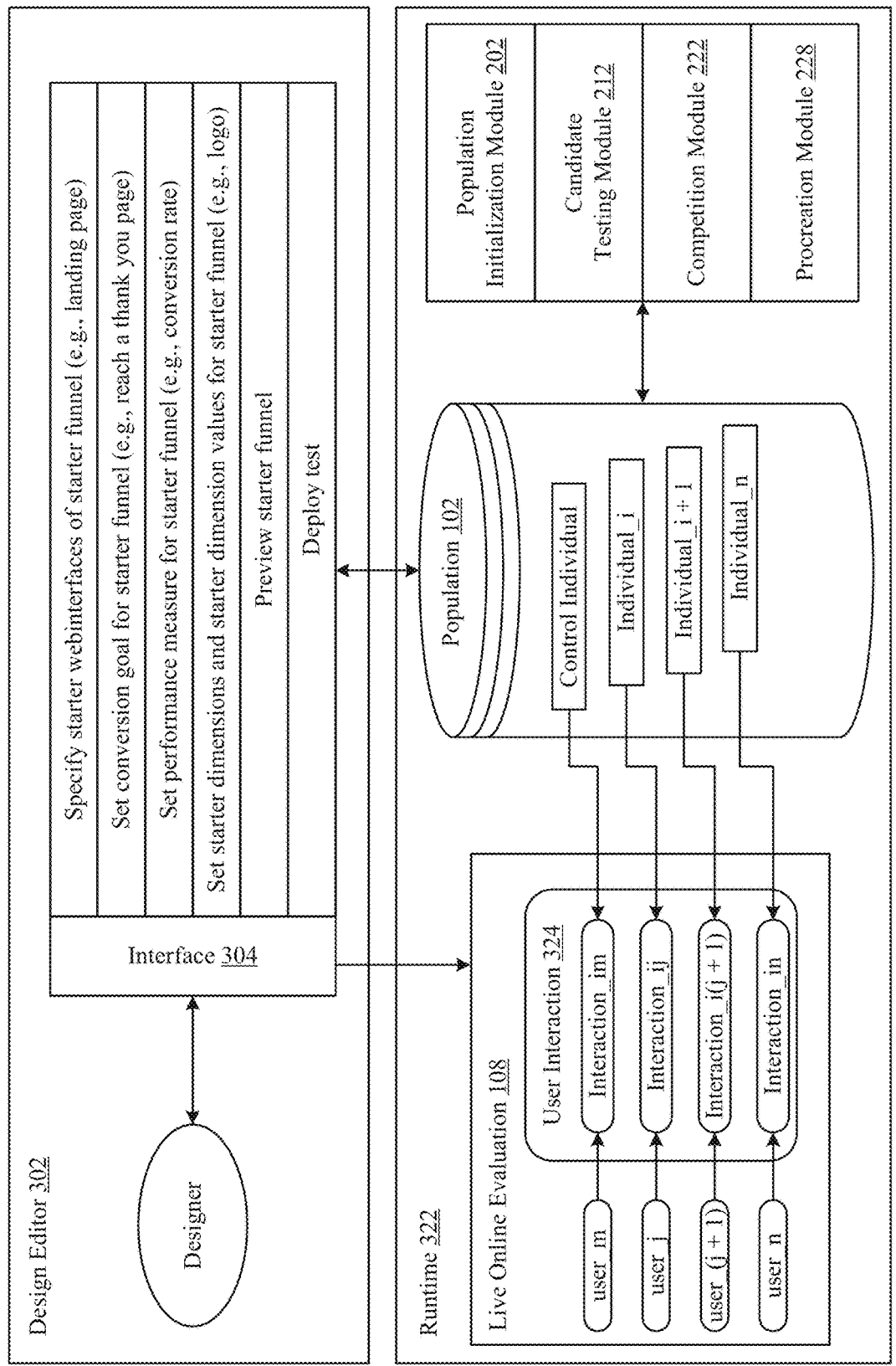
FIG. 3 shows a workflow of the disclosed machine learned conversion optimization (MLCO).

The candidate search space is defined by the population initialization module 202 in dependence upon at least one starter funnel, and the starter dimensions and starter dimension values of its starter webinterfaces. In implementations, the starter funnel is defined using a design editor 302, shown in FIG. 3. Design editor 302 comprises various interface components as part of interface 304 that are used by a designer, marketer, advertiser, or content creator to implement a MLCO workflow. In particular, the design editor 302 is used by the designer to: specify one or more starter webinterfaces of the starter funnel; set a conversion goal for the starter funnel; set a performance measure for the starter funnel; set starter dimensions and starter dimension values for each of the starter webinterfaces of the starter funnel; preview the starter funnel; and deploy the test.

Figure 4:
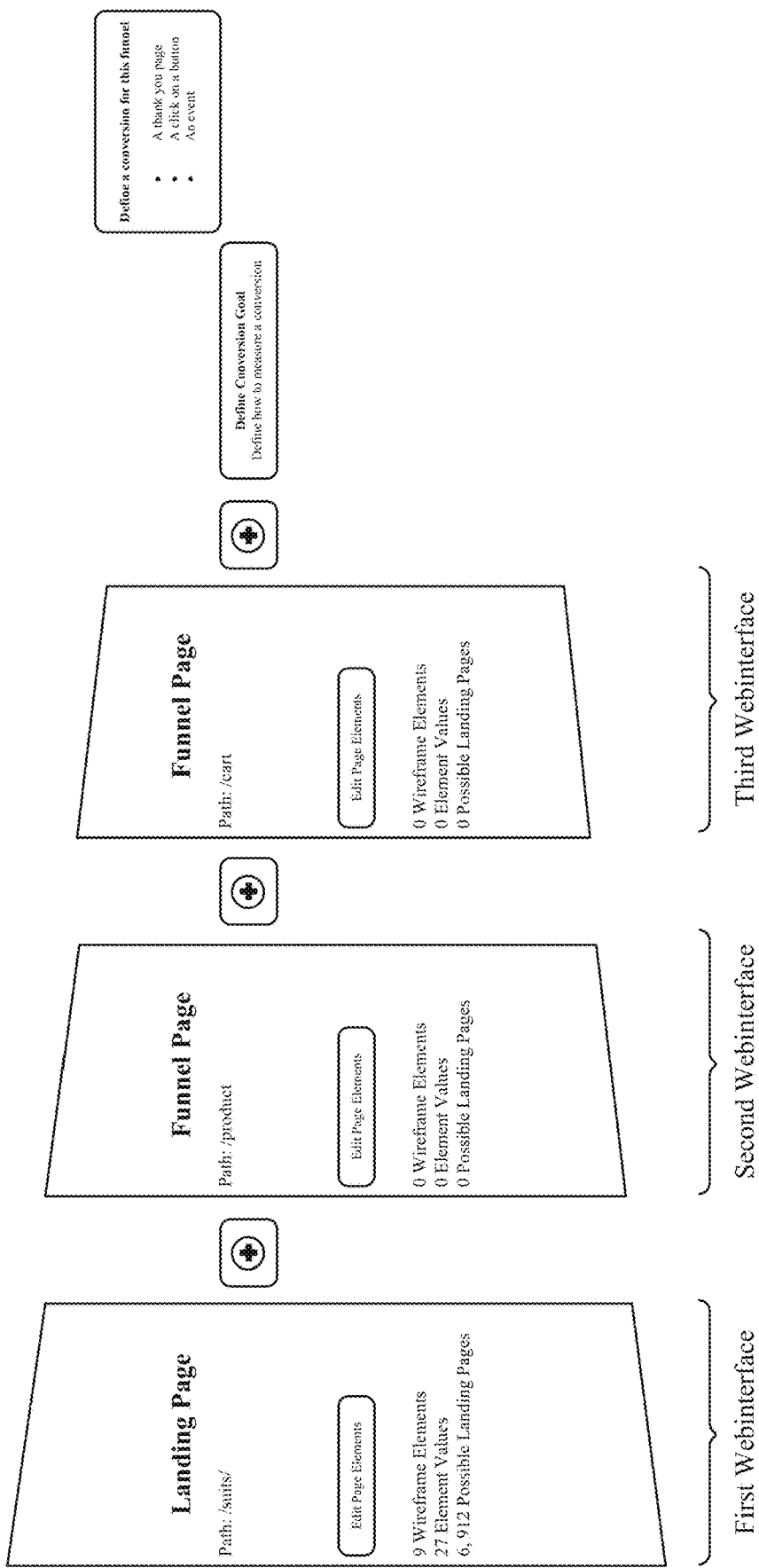
FIG. 4 illustrates a funnel with multiple webinterfaces.

FIG. 4 shows one implementation of a starter funnel with three starter webinterfaces (e.g., one landing page and two funnel pages). In one implementation, the starter webinterfaces are identified in the starter funnel by their respective access paths (e.g., unified resource locators (URLs), and arranged in a topological sequence. Typically, the topological sequence determines a path an end user follows through a funnel to complete a conversion goal defined for the funnel. The topological sequence is set graphically by the designer across the interface 304 and stored logically in memory.

FIG. 4 also depicts a "define conversion goal" button that allows the designer to set a conversion goal for the starter funnel. Examples of a conversion goal also include "increase leads" or "increase revenue". The designer also defines what type of events will be considered to indicate that a conversion has occurred, such as visiting a thank you page, clicking on a button or link, or a custom event. After setting the conversion goal, the designer specifies a performance measure for the starter funnel. The performance measure is used by the disclosed evolutionary computations to evaluate the performance of the candidate individuals during the test.

Figure 5:
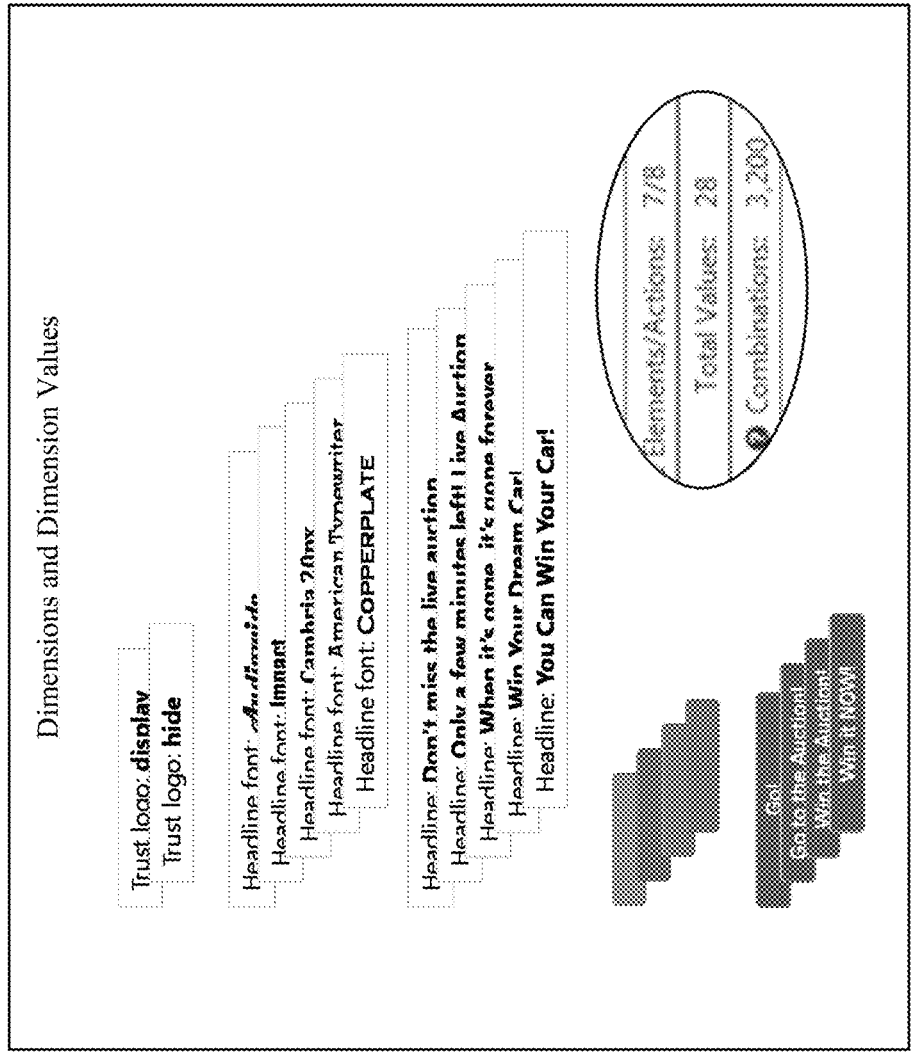
FIG. 5 depicts a webinterface layout of a funnel.
Figure 5:
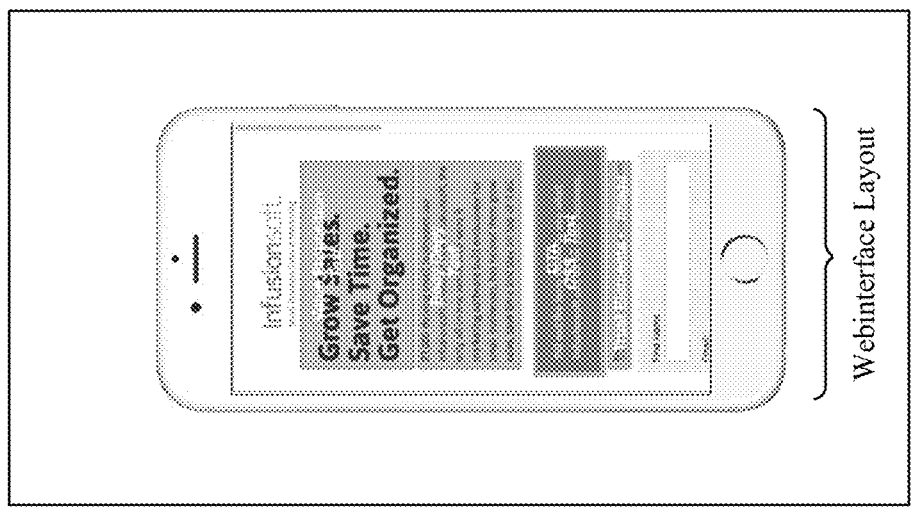

Then, a webinterface layout is generated for the starter funnel. As used herein, a "webinterface layout" is merely a template within which the alternative values for dimensions are inserted in order to define a particular webinterface of a funnel. In one implementation, the webinterface layout is displayed across a simulated device selected by the designer from among options of devices with varying screen canvases (e.g., smartphones, tablets, computers, wearable devices). In some implementations, the options of devices lists different device models like iPhone6™, Samsung Galaxy S6™, and others. FIG. 5 illustrates one implementation of a webinterface layout and different dimensions and dimension values that can be applied to the webinterface layout.

Then, the designer selects different page elements (referred to herein as "starter dimensions") to be included in the webinterface layout for each of the starter webinterfaces of the starter funnel. In one implementation, the designer also specifies a type for a page element. For example, a name of the page element is "Clean, Awesome and Multi-Purpose" and the type of the page element is "Headline-Main". Advancing further, the designer defines different sub-elements (also referred to herein as "starter dimensions") for each of the starter webinterfaces of the starter funnel. Examples of sub-elements include text, formatting/CSS (Cascading Style Sheets), page element concealment, page element removal, class, HTML, custom jQuery, and image. In some implementations, the designer can activate or deactivate some of the sub-elements (e.g., using a dropdown). In one implementation, the inactive sub-elements are displayed across the interface 304 with strikethrough. In other implementations, the design editor 302 automatically makes some sub-elements active and others inactive.

Then, the designer sets sub-elements values (referred to herein as "starter dimension values") for each of the defined sub-elements. In addition, the designer also sets, for each of the defined sub-elements, a control sub-element value and one or more test sub-element values. In other implementations, the design editor 302 automatically sets a default control value for the sub-elements. For example, for the page element "Headline-Main", the control sub-element value is set to be "Clean, Awesome and Multi-Purpose" and test sub-element values are set to be "Slick, Awesome and Powerful", "New, Fast, Better", "Shiny, Better than the Competition", and "Best you can Buy". Similarly, in other implementations, different page elements and corresponding sub-elements and sub-element values can be defined as a set of starter dimensions and starter dimension values of each of the starter webinterfaces of the starter funnel.

Each webinterface of a funnel can be thought of as a point in a vector-based search space. Each dimension axis in the vector space corresponds to one of the page elements, and each different coordinate position along a given axis indicates one of the designer-specified alternatives for that page element. For example, in FIG. 5, the call-to-action dimension has four coordinate positions (values or alternatives), namely "Go!", "Go to the Auction!", "Win the Auction!", and "Win it NOW!". A particular webinterface of a funnel specifies a value for each of the page elements/dimensions.

Figure 6:
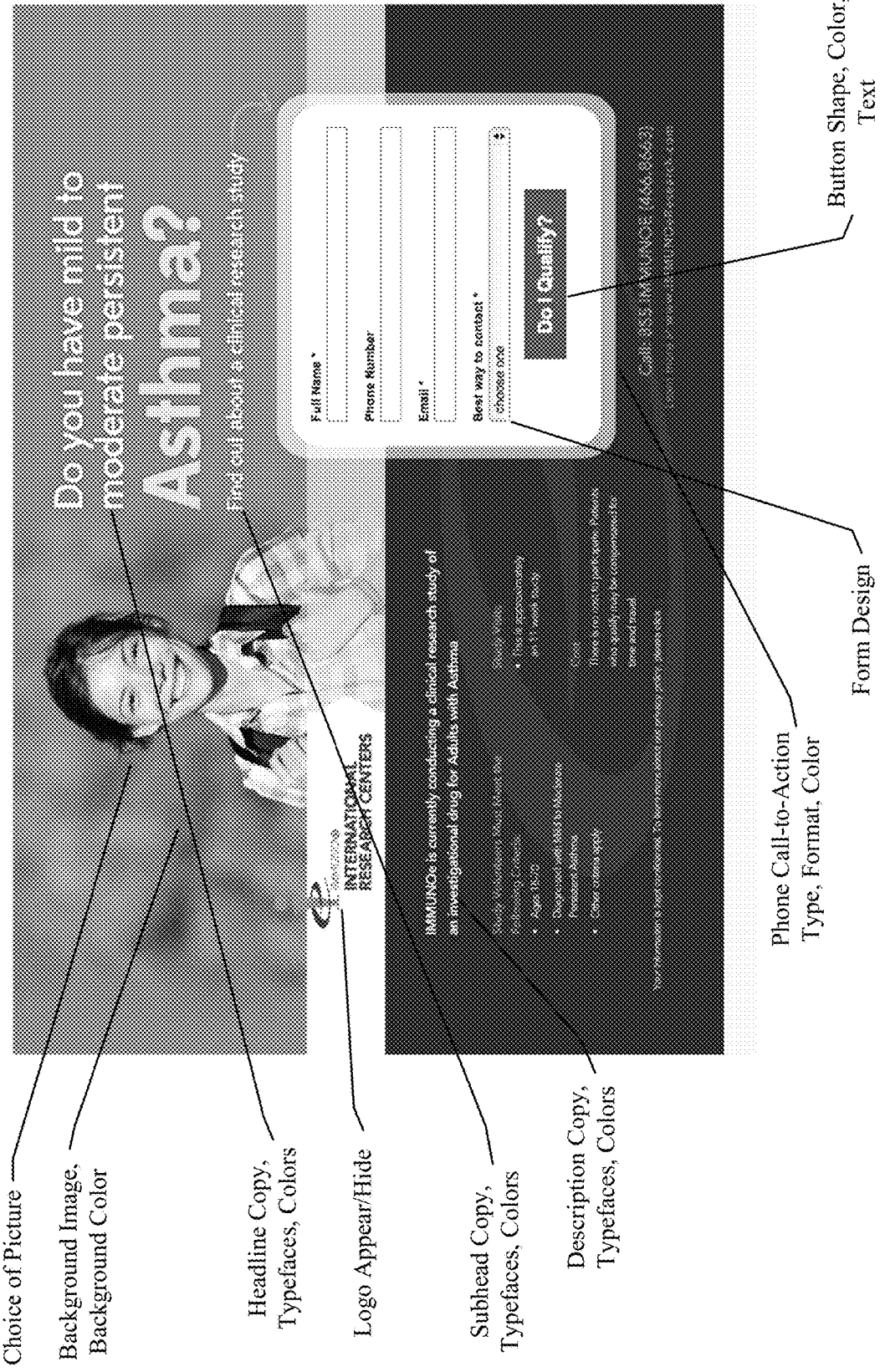
FIG. 6 shows a webinterface of a funnel with its dimensions and dimension values.

FIG. 6 shows one implementation of a webinterface of a funnel. In FIG. 6, the webinterface is defined by the arrangement or position of different page elements/dimensions in the webinterface layout, and corresponding properties or values of the page elements/dimensions, including, choice of picture (page element/dimension), background image (page element/dimension), background color (page element property/dimension value), headline copy (page element/dimension), typefaces and colors of the headline copy (page element property/dimension value), appearance or concealment of logo (page element/dimension), subhead copy (page element/dimension), typefaces and colors of the subhead copy (page element property/dimension value), description copy (page element/dimension), typefaces and colors of the description copy (page element property/dimension value), phone call-to-action (page element/dimension), type, format, and color of the phone call-to-action (page element property/dimension value), form design (page element/dimension), button (page element/dimension), and shape, color, and text of the button (page element property/dimension value).

Once created, a preview of the starter funnel, and its comprising starter webinterfaces, is presented to the designer across the interface 304.

With the definition of the starter funnel understood, the discussion now turns to how a corresponding starter candidate individual is initialized by encoding the starter funnel at runtime.

Starter Individual Initialization

Figure 7:
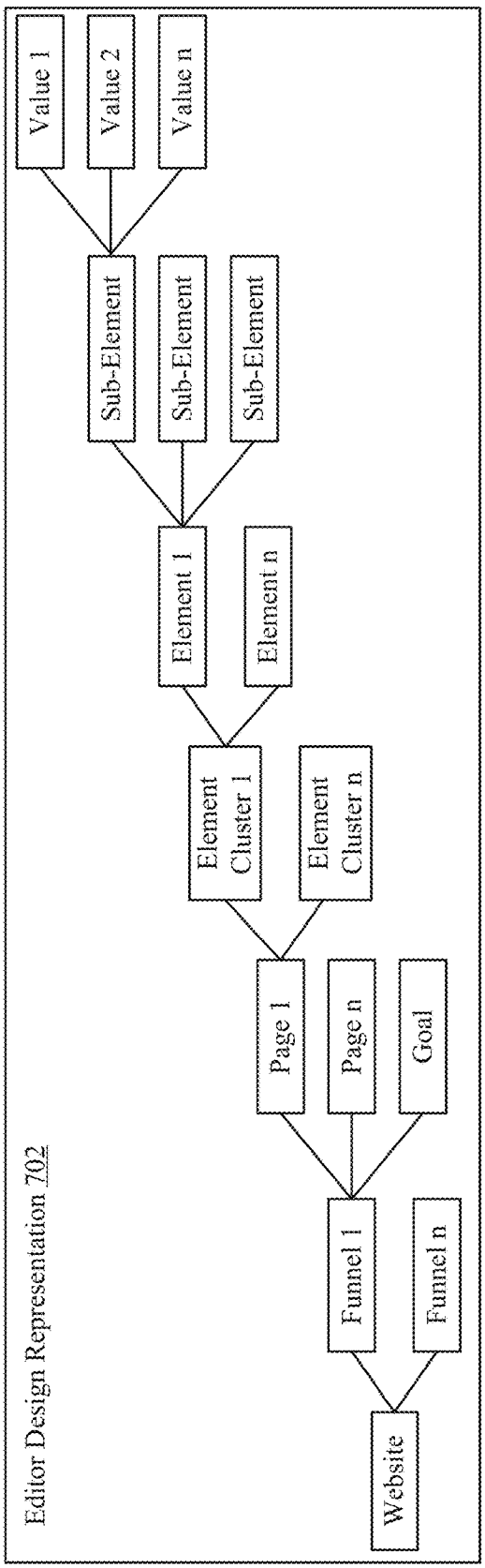
FIG. 7 is a symbolic drawing of one implementation of transforming an editor design representation of a starter funnel into a runtime design representation.
Figure 7:
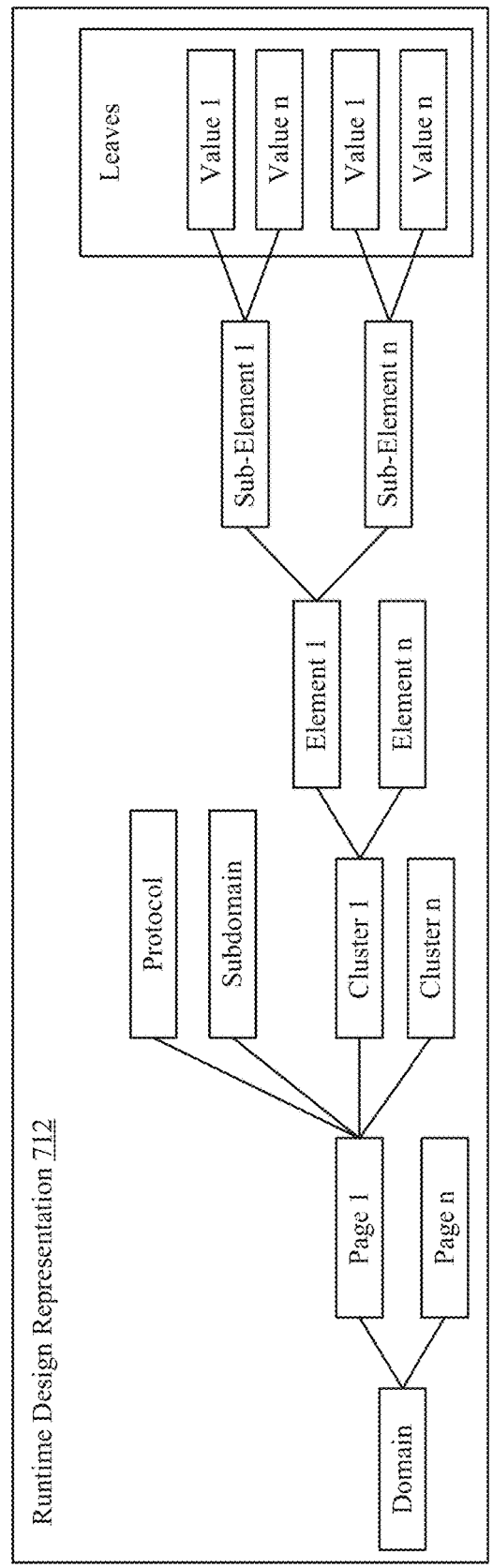

FIG. 7 is a symbolic drawing of one implementation of transforming an editor design representation 702 of a starter funnel into a runtime design representation 712. At runtime 322, the editor design representation 702 of the starter funnel defined by the designer is transformed into the runtime design representation 712. In the example used in FIG. 7, the editor design representation 702 includes a tree. The root of the tree is the highest level of granularity for which a test is performed. For a website or mobile webpage, the root is the domain. For mobile applications, the root is the application. For e-mails, the root is the e-mail; the subject and pages are next level of the tree. For other applications (such as advertising), different mappings can be used. In the domain of webpages and mobile applications, a website has one to n funnels; each funnel has a goal, and one to n pages. Each page has one to n clusters of elements. Each cluster has one to n elements. Each element has a set of sub-elements that change a property of the element. As used herein, sub-elements are elements too. Each sub-element has one to n values. In other implementations, the structure might be different. For example, elements might not be clustered, or the representation might not be hierarchical at all.

Also at the runtime 322, the starter funnel is represented by a starter genome that encodes it as a binary formulation. In one implementation, the binary encoding is a concatenation of the leaves of the tree, which in the case of the starter funnel includes concatenating the starter dimensions and starter dimension values of each of the starter webinterfaces of the starter funnel. In some implementations, prior to the genome encoding, a schematic representation of the editor designer representation 702 is generated in the form of runtime design representation 712. In other implementations, the genome encoding can be based on other schemes relying on data types other than binary data type (0 or 1), such as quantitative or numerical data type, qualitative data type, discreet data type, continuous data type (with lower and upper bounds), integers data type (with lower and upper bounds), nominal data type, ordinal or ranked data type, categorical data type, interval data type, and/or ratio data type. For example, the genome encoding can be based on, or any combination thereof, real values between 0 and 1, continuous values such as Red, Green, Blue (RGB) values between 0 and 256, hexadecimal values of CSS colors (e.g., #F0F8FF), categorical color values of CSS colors (e.g., AliceBlue), respective values of other CSS property groups and properties (such as the ones listed on the web at <http://www.w3schools.com/cssref/#animation>), size of a particular dimension (e.g., height and width), a set of different values and data types (e.g., different numeric dollar price values or a combination of different numeric dollar price values and heights and widths), and others.

Figure 8:
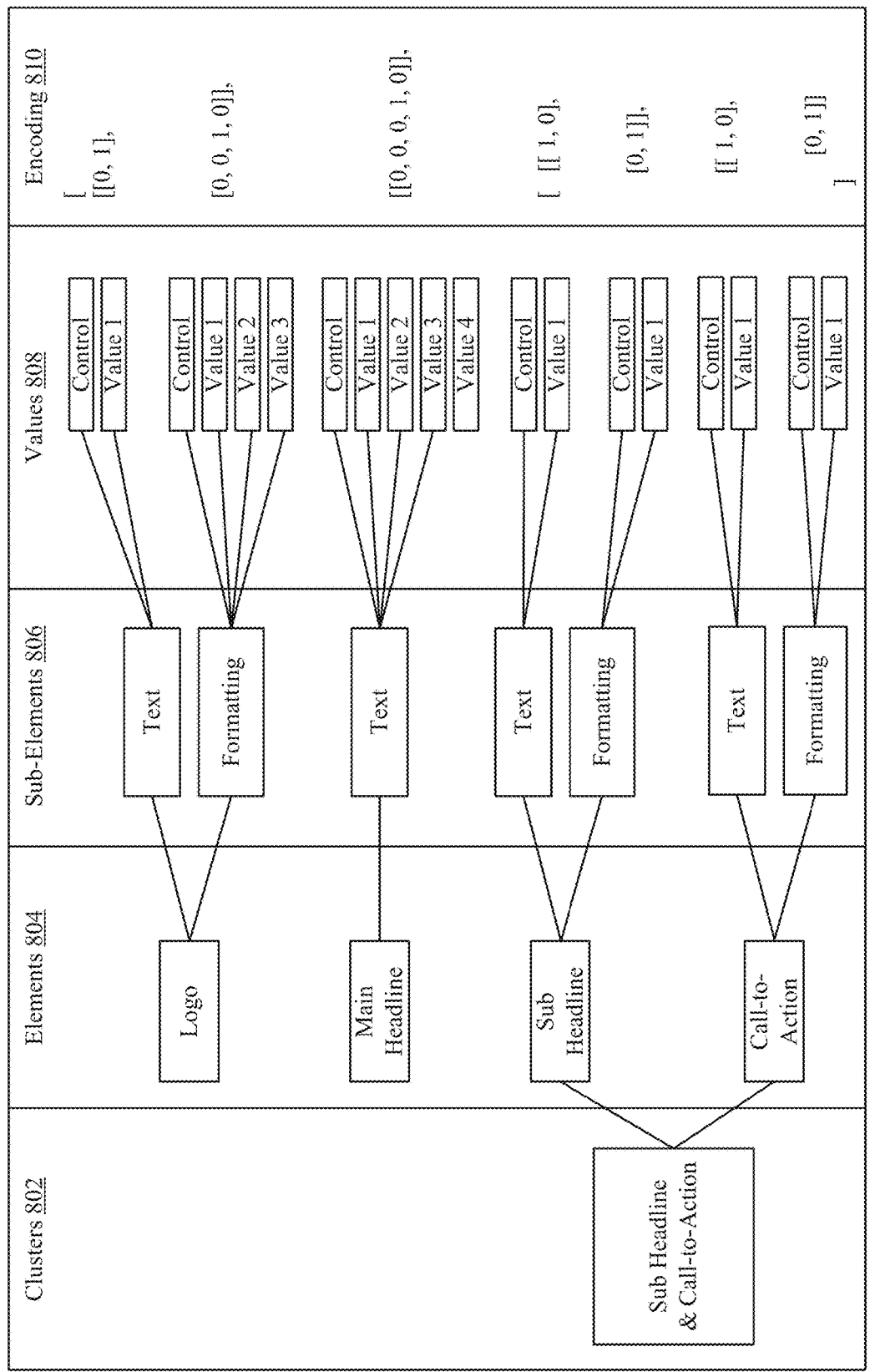
FIG. 8 depicts a symbolic drawing of one implementation of encoding starter dimensions and starter dimension values of a starter funnel.

FIG. 8 depicts a symbolic drawing of one implementation of encoding starter dimensions and starter dimension values of a starter funnel. In FIG. 8, clusters 802, elements 804, sub-elements 806, and sub-element values 808 corresponding to the sub-elements 806 of the starter funnel are encoded into a binary string encoding 810. In the binary string encoding 810, the left most bit for each sub-element value is the control value. In other implementations, the binary string encoding 810 can be based on other schemes relying on data types other than binary data type (0 or 1), such as quantitative or numerical data type, qualitative data type, discreet data type, continuous data type (with lower and upper bounds), integers data type (with lower and upper bounds), nominal data type, ordinal or ranked data type, categorical data type, interval data type, and/or ratio data type. For example, the binary string encoding 810 can be based on, or any combination thereof, real values between 0 and 1, continuous values such as Red, Green, Blue (RGB) values between 0 and 256, hexadecimal values of CSS colors (e.g., #F0F8FF), categorical color values of CSS colors (e.g., AliceBlue), respective values of other CSS property groups and properties (such as the ones listed on the web at <http://www.w3schools.com/cssref/#animation>), size of a particular dimension (e.g., height and width), a set of different values and data types (e.g., different numeric dollar price values or a combination of different numeric dollar price values and heights and widths), and others.

Figure 9:
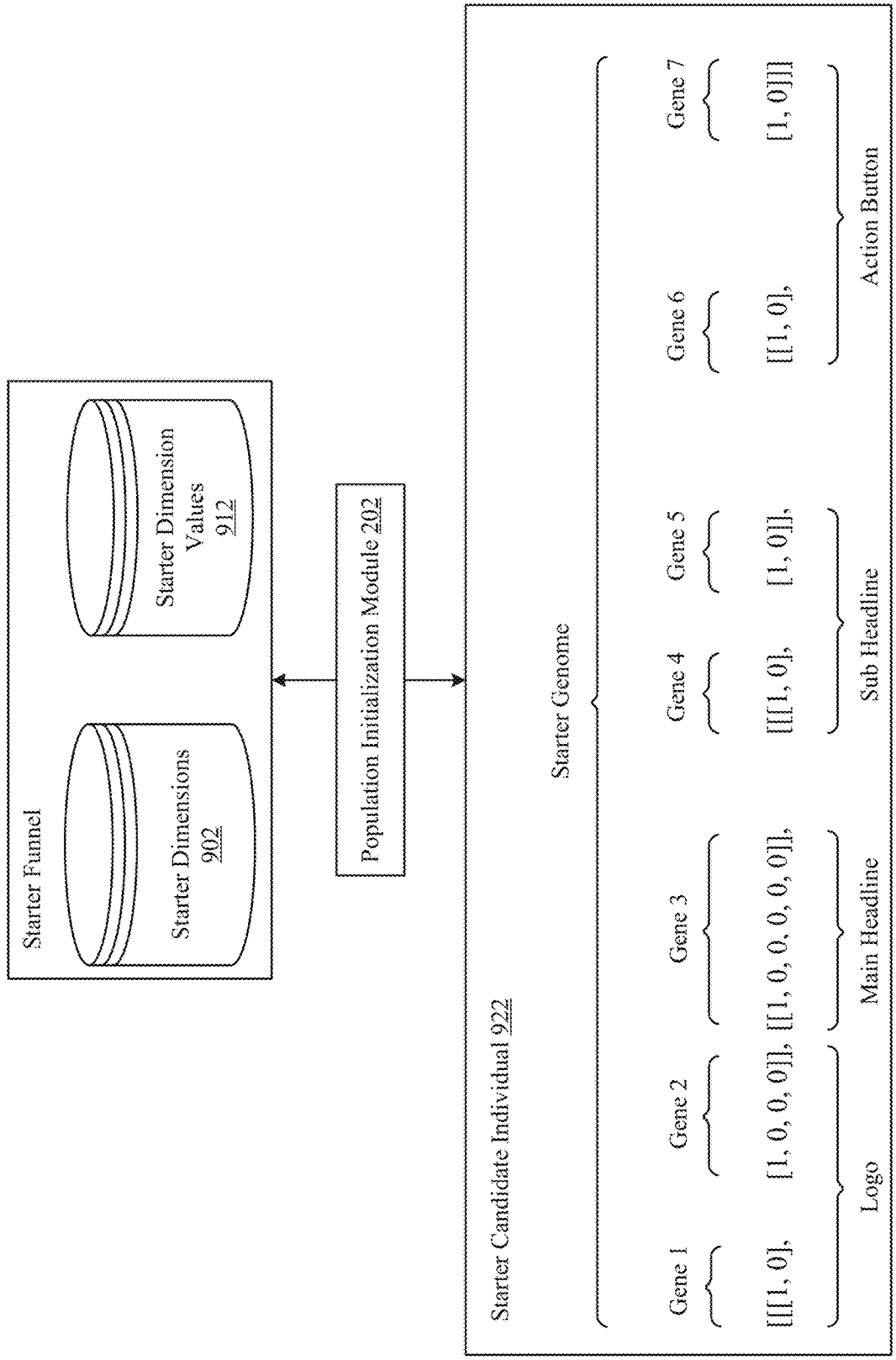
FIG. 9 illustrates one implementation of encoding starter dimensions and starter dimension values of a starter funnel into a starter candidate individual/starter genome.

FIG. 9 illustrates the population initialization module 202 encoding starter dimensions 902 and starter dimension values 912 of a starter funnel into a starter candidate individual/starter genome. In particular, the encoding produces a binary sequence representing a starter candidate individual 922. The encoding of the starter candidate individual 922 is shown below:

```
[
    [ [0, 1],  [0, 0, 1, 0]  ],      Logo
    [ 0, 0, 0, 1, 0          ],      Main Headline
    [                                Cluster
        [ [1, 0],  [0, 1]  ],        Sub Headline
        [ [1, 0],  [0, 1]  ],        Call-to-Action
    ]
]
```

Starter genome 922 includes seven genes corresponding to each of the seven sub-elements 806. The left most bit of each gene is the control value. In other implementations, the encoding of the starter candidate individual 922 can be based on other schemes relying on data types other than binary data type (0 or 1), such as quantitative or numerical data type, qualitative data type, discreet data type, continuous data type (with lower and upper bounds), integers data type (with lower and upper bounds), nominal data type, ordinal or ranked data type, categorical data type, interval data type, and/or ratio data type. For example, the encoding of the starter candidate individual 922 can be based on, or any combination thereof, real values between 0 and 1, continuous values such as Red, Green, Blue (RGB) values between 0 and 256, hexadecimal values of CSS colors (e.g., #F0F8FF), categorical color values of CSS colors (e.g., AliceBlue), respective values of other CSS property groups and properties (such as the ones listed on the web at <http://www.w3schools.com/cssref/#animation>), size of a particular dimension (e.g., height and width), a set of different values and data types (e.g., different numeric dollar price values or a combination of different numeric dollar price values and heights and widths), and others.

With the initialization and encoding of the starter candidate individual understood, the discussion now turns to how the candidate search space is defined.

Candidate Search Space Definition

As discussed above, the candidate search space is defined based on the starter funnel. In particular, the population initialization module 202 defines the candidate search space by subjecting the starter dimensions and starter dimension values of the starter funnel to combinatorial operations. In one example, if the designer specifies 4 starter page elements (e.g., logo, main headline, sub headline, call-to-action), 7 possible starter sub-elements, and 19 possible starter sub-element values, then a candidate search space with 640 possible combinations of dimensions and dimension values is defined by subjecting 8 different variations of the logo, 5 different variations of the main headline, 4 different variations of the sub headline, and 4 different variations of the call-to-action to combinatorial operations (i.e., 8×5×4×4=640).

With the definition of the candidate search space understood, we now turn to how various generations of the evolutionary computations disclosed herein are optimized.

Generation Optimization

Starter Funnel Based Optimization

In implementations, the population initialization module 202 creates the preliminary pool of candidate individuals (e.g., a first generation) in dependence upon at least one starter funnel and the starter dimensions and starter dimension values of its starter webinterfaces (e.g., starter genome 922). In one implementation, candidate individuals in the first generation are initialized in a manner that ensures that each of the starter dimension values occurs in only one of the initialized individuals of the first generation. FIG. 10 depicts such an implementation. In FIG. 10, the starter genome 922 has 7 genes and 19 possible gene values. As a result, in just the starter genome 922, 7 of the 19 gene values are initialized. Accordingly, the population initialization module 202 creates 12 additional genomes such that the remaining 12 possible gene values are initialized in the respective 12 additional genomes. In FIG. 10, the 12 possible gene values are depicted with a grey background. Thus, in the example where the candidate search space comprised 640 possible combinations of dimensions and dimension values, only a subset of the 640 possible combinations (e.g., 13 combinations in FIG. 10) is initialized in the first generation.

In another implementation, candidate individuals in the first generation are initialized in a manner that ensures that each of the starter dimension value occurs in at least one of the initialized individuals of the first generation.

In another example, assume that a starter genome is specified to include 28 starter dimension values for a set of starter dimensions. Note that some or all of the 28 starter dimension values can apply to the same starter dimension or to a set of different starter dimensions. Thus, in some instances, multiple starter dimension values from the 28 starter dimension values apply to a single starter dimension, which is a member of a group consisting of a plurality of starter dimensions. In the example shown in FIG. 5, the "headline font" starter dimension can have five different starter dimension values, namely "Audiowide", "Impact", "Cambria 20px", "American Typewriter", and "Copperplate". Similarly, the "headline text" starter dimension can have five different starter dimension values as well, namely "Don't miss the live auction", "Only a few minutes left! Live Auction", "You can Win Your Car!", "When it's gone, it's gone forever", and "Win Your Dream Car!". In the same vein, the "sub-headline background color" starter dimension can have four different starter dimension values, namely blue, cyan, orange, and red. Also, the "sub-headline text" starter dimension can have four different starter dimension values, namely "Go!", "Go to the Auction!", "Win the Auction!", and "Win it NOW!".

Accordingly, in one implementation, the first generation is initialized in a manner that ensures that each of the 28 starter dimension values is included in only one of the candidate individuals of the first generation. In another implementation, the first generation is initialized in a manner that ensures that each of the 28 starter dimension values is included in at least one of the candidate individuals of the first generation. In such implementations, multiple starter dimension values from the 28 starter dimension values are included in a single candidate individual of the first generation. This ensures that each of the starter dimensions and dimension values identified in one or more starter dimensions are provided as input to the disclosed evolutionary computations so that the performance measures 106 can be developed for them during the live online evaluation 108.

In other implementations, the candidate individuals are initialized by randomly selecting from the candidate search space an available value for a set of dimensions. In yet other implementations, the candidate individuals are initialized in a maximally uniform manner across the distribution of dimension values in the candidate search space in dependence upon a predetermined number of candidate individuals to be created. In one implementation, once created, a candidate individual is stored in the candidate individual population 102 as a vector having a particular value for each dimension.

Test Parameters Based Optimization

The evolutionary computations disclosed herein customize the MLCO in dependence upon one or more test parameters specific to a particular organization seeking promotion of the target user behavior. Examples of such test parameters include live user traffic registered or received by the organization (e.g., on a weekly, monthly, quarterly, or other calendar basis) and the performance measures 106 (e.g., conversion rate, revenue rate (determined over a sample of users)) registered by the organization. In implementations, values for such test parameters are provided by the organization or determined over an initial testing period.

Additionally, since live user traffic is a valuable commodity in a webpage testing environment, the evolutionary computations disclosed herein generate and process the various generations in an efficient manner. In one implementation, the evolutionary computations disclosed herein achieve such efficiency by ensuring that, given an amount of live user traffic received by an organization during a time period (e.g., in a week or month), a minimum number of evolutionary computation loops are completed within the time period to yield evolved candidate individuals that have been determined by the live online evaluation 108 to have superior values for the performance measures 106. So, in one example, if the amount of live user traffic received by an organization during a month is hundred thousand users (i.e., 100,000 users/month), then the evolutionary computations disclosed herein can be configured to generate and process at least three generations within the month.

In another implementation, such efficiency is achieved by ensuring that, given an amount of live user traffic received by an organization during a time period (e.g., in a week or month), a minimum number of candidate individuals are evolved (or subjected to the live online evaluation 108 over a sample of users) within the time period and/or only a limited number of candidate individuals are processed at each generation so that multiple generations are evolved within the time period. So, in one example, if the amount of live user traffic received by an organization during a month is hundred thousand users (i.e., 100000 users/month), then the evolutionary computations disclosed herein can be configured to generate and process at least fifty candidate individuals across three generations within the month such that each candidate individual is live evaluated by at least two thousand users. In another example, the evolutionary computations disclosed herein can be configured to generate and process no more than seventeen candidate individuals at each of the three generations.

In yet another implementation, a specialized scheme for initializing the first generation includes making a maximum population size of the candidate individual population a function of the live user traffic and the performance measures 106 (e.g., conversion rate, revenue rate (determined over a sample of users). Furthermore, when a maximum population size calculated for an organization based on its live user traffic and performance measures 106 is not consistent with the number of starter dimensions and/or the number of starter dimension values specified by the organization's designer, the evolutionary computations disclosed herein use specialized selection schemes to select starter dimensions and starter dimension values for candidate individual initialization in a manner that ensures a population size of the candidate population at some (e.g., just the first generation) or at all generations is constrained by the maximum population size calculated for the organization. In one implementation, this is achieved by traversing the starter dimensions and/or the starter dimension values on a gene-by-gene basis and only selecting a subset of values in each gene and/or only a subset of genes for candidate individual initialization. In such an implementation, the selection of the subset of values in each gene and/or the subset of genes can be biased for earlier values and/or earlier genes or later values and/or later genes, can be uniform selection of genes and/or values at the gene-level, can be one-point selection of genes and/or values at the gene-level, can be two-point selection of genes and/or values at the gene-level, or can be random selection of genes and/or values at the gene-level. In other implementations, the selection of genes and/or values at the gene-level can be based on any other conventional or future-developed selection technique.

In another implementation, the maximum population size-based constraint is achieved by distributing selection of the starter dimensions and/or the starter dimension values across different generations such that some subsets of the starter dimensions and/or the starter dimension values specified by the organization's designer are selected in earlier generations and other subsets are selected at later generations. The selection of subsets can be uniform, one-point, two-point, random, or can be based on any other conventional or future-developed selection technique.

Assume, in one example, that given the amount of live user traffic received by an organization during a month is fifty thousand users (i.e., 50000 users/month) and that each candidate individual is supposed to be live evaluated by at least two thousand users, the maximum population size determined for the organization is twenty-five candidate individuals across three generations. Also assume that the organization's designer has selected thirty starter dimensions, each with four starter dimension values. If the standard initialization scheme is implemented, which requires each starter dimension value to occur in only one candidate individual, a hundred and twenty starter dimension values would require at least ninety one (91) candidate individuals to be created in just the first generation. However, this would in conflict with the maximum population size of twenty-five calculated for the organization, which limits candidate individual count in a given generation to either eight or nine.

To resolve this conflict, the specialized initialization and selection schemes of the evolutionary computations disclosed herein can select a subset of the hundred and twenty starter dimension values and/or a subset of the thirty starter dimensions to initialize only eight candidate individuals in each of the first and second generations and only nine candidate individuals in the third generation, according to one implementation. In implementations, the selection can be random or biased towards earlier or later starter dimension values and/or starter dimensions. In other implementations, the starter dimension values and/or the starter dimensions that are not selected during the first generation can be included in the candidate population at the end of the second generation, or at any other subsequent generation.

In implementations, any stage and/or generation (e.g., first, second, third, fourth, tenth, or twentieth generation, and so on) of the evolutionary computations disclosed herein can utilize the specialized and/or the standard initialization schemes. As used herein, the term "initialization" or "initialize" refers to an evolutionary operation that can be applied at any generation of the evolutionary computations to create and/or procreate new candidate individuals.

With the population initialization understood, we turn to how the individuals are tested.

Testing Individuals

Candidate testing module 212 tests the candidate individuals in the population 102. Each candidate individual undergoes a battery of tests or trials, each trial testing the candidate individuals on one or multiple samples of users with sample sizes ranging from hundreds, thousands, and millions of users. In another implementation, the number of tests or sample size is determined by parameters associated with the test. Examples of such test parameters include number of visitors per unit time, existing conversion rate, size of the candidate search space, preferred risk tolerance, and the type of performance measure. The tests or trials are implemented as the live online evaluation 108 where funnels generated in dependence upon the candidate individuals are presented to real world users for testing. Then, the performance measures 106 are collected based on the live online evaluation 108 during which the real world users interact with the funnels. The candidate testing module 212 updates the performance measures 106 associated with each of the tested candidate individuals on a real time basis. The frequency of the updates is also determined by the test parameters.

Fitness-Proportionate Procreation

To consume the live user traffic efficiently, the evolutionary computations disclosed herein, in some implementations, use specialized procreation schemes to create a second generation of individuals. In one implementation, a specialized scheme for procreating the second generation includes the procreation module 228 subjecting genomes created during the first generation, i.e., parent genomes, to fitness-proportionate selection (e.g., roulette wheel selection, stochastic universal sampling). In such an implementation, every parent genome has a chance of being selected to breed but fitter parent genomes are more likely to be chosen than weaker parent genomes. This is achieved by making a parent genome's selection probability a function of its fitness defined by the performance measures 106 (e.g., conversion rate, revenue rate (determined over a sample of users)). In one implementation, the selection from a given parent genome is done on a gene-by-gene basis in dependence upon the selection probability of a particular gene. In some implementations, the particular gene's selection probability is a function of the performance measures 106 (e.g., conversion rate, revenue rate (determined over a sample of users)) of the genome that contains the particular gene. Accordingly, the resulting genomes in the second generation include genes selected from the parent genomes in dependence upon their respective selection probabilities.

In yet another implementation, the second generation is procreated by making random selections from the parent genomes on a gene-by-gene basis.

In implementations, any stage and/or generation (e.g., first, second, third, fourth, tenth, or twentieth generation, and so on) of the evolutionary computations disclosed herein can utilize the specialized procreation schemes.

After procreation, the candidate testing module 212 operates again on the updated population 102. The process continues repeatedly. In implementations, a control module 230 iterates the candidate testing module 212 and the procreation module 228.

Competition

In one implementation, the evolutionary computations utilize a competition module 222, which is operationalized in certain generations. The competition module 222 updates the candidate individual population 102 contents in dependence upon the updated performance measures 106. In some implementations, the competition module 222 discards candidate individuals that do not meet a minimum baseline individual fitness (e.g., pre-set by an administrator or automatically set), or candidate individuals whose "individual fitness" relatively lags the "individual fitness" of similarly tested candidate individuals. Population 102 is updated with the revised contents.

The competition module 222 manages graduation of candidate individuals from one generation to the next. This process can be thought of as occurring one candidate individual at a time, as follows. First, a loop is begun through all candidate individuals for whom the performance measures 106 have been updated since the last time the competition module 222 was executed. In one implementation, if the performance measures 106 for a current candidate individual are still below a baseline individual fitness (e.g., pre-set by an administrator or automatically set) or are sufficiently lagged relative to individual fitness of other candidate individuals, then the current candidate individual is discarded and the next one is considered. If the performance measures 106 for the current individual are above a baseline individual fitness (e.g., pre-set by an administrator or automatically set) or are relatively on par with individual fitness of other candidate individuals, then the current candidate individual is added to the next generation. The process then moves on to consider the next candidate individual in sequence.

Relative Performance Measure

High performance measures of individuals with less experience could be due to luck rather than true fitness (e.g., due to unrealistic affinity of the users to an individual due to holiday season). That is, if compared to other individuals that have much more experience, younger, luckier individuals that have been determined to have high performance could still displace individuals whose fitness levels are lower but more realistic. Allowing such individuals to compete against each other solely on the basis of absolute fitness would optimize the evolutionary computations for individuals that are lucky.

A solution to this problem is that candidate individuals be compared based on their "relative performance measures", instead of their absolute performance measures. A relative performance measure of a candidate individual is calculated based on the difference between an absolute performance measure of a control individual determined in a first time period and an absolute performance measure of the candidate individual also determined in the first time period. So, for example, if a first candidate individual created during a first generation has an absolute average conversion rate of 40% and a first control individual also initialized in the first generation has an absolute average conversion rate of 35%, then the relative performance measure of the first candidate individual is 5% (40%−35%=5%). Similarly, if a second candidate individual created during a second generation has an absolute average conversion rate of 45% and the first control individual's absolute average conversion rate in the second generation has increased to 42%, then the relative performance measure of the second candidate individual is 3% (45%−42%=3%). Accordingly, the first and second candidate individuals are compared based on their respective relative performance measures and the first candidate individual is found to be 2% better than the first candidate individual (5%−3%=2%), even though the absolute performance measure of the second candidate individual is 5% (45%−40%=5%) higher than that of the first candidate individual. Each comparison made by the competition module 222 between the relative performance measure of one individual and that of another is sometimes referred to herein as a comparison "instance".

In one implementation, the competition module 222 determines whether the relative performance measure of the current candidate individual exceeds that of the least fit candidate individual in the candidate individual population 102. If so, then the least fit candidate individual is discarded, and the current candidate individual is moved to the next generation. If not, then the current candidate individual is discarded. The process then moves on to consider the next candidate individual in sequence.

Crossover and Mutation Based Procreation

Regarding procreation, any conventional or future-developed technique can be used for procreation. In an implementation, conditions, outputs, or rules from parent individuals are combined in various ways to form child individuals, and then, occasionally, they are mutated. The combination process for example may include crossover—i.e., exchanging conditions, outputs, or entire rules between parent individuals to form child individuals. New individuals created through procreation begin with performance measures that are indicated as undefined.

The procreation module 228 adds to the candidate individual population 102 new individuals formed in dependence upon a respective set of one or more parent individuals from the candidate individual population 102 and not yet selected for discarding by the competition module 222. In one implementation, a third generation of genomes is created by selecting pairs of parent genomes from the second generation and subjecting the parent genome pairs to a crossover scheme. In other implementations, procreation (e.g., crossover and/or mutation) can be initiated at any other generations, such as the first, second, fourth, or tenth generation, and so on.

Crossover

Regarding crossover, parent genome pairs are identified for crossover when a subsequently selected second parent genome differs from a first parent genome selected from the candidate population immediately before the second parent genome. In implementations, a parent genome can be selected to participate in multiple crossover operations during the same generation. In some implementations, within a given generation, a variety of crossover schemes are used to carry out crossover between parent genome pairs until a count of offspring genomes reaches the maximum population size determined for the given generation. In one implementation, the crossover occurs on a gene-by-gene basis. So, in one example, parent genomes can crossover based on sub-elements 806 and/or sub-element values 808, shown in FIG. 8. In other implementations, the crossover schemes applied at the gene-level to evolve a particular generation can be based on a variety of crossover schemes such as uniform crossover (e.g., selecting gene values alternatively from the parent genome pairs), one-point crossover, two-point crossover, and/or random crossover. In yet other implementations, the crossover schemes applied at the gene-level to evolve a particular can be based on any other conventional or future-developed crossover technique.

Figure 11:
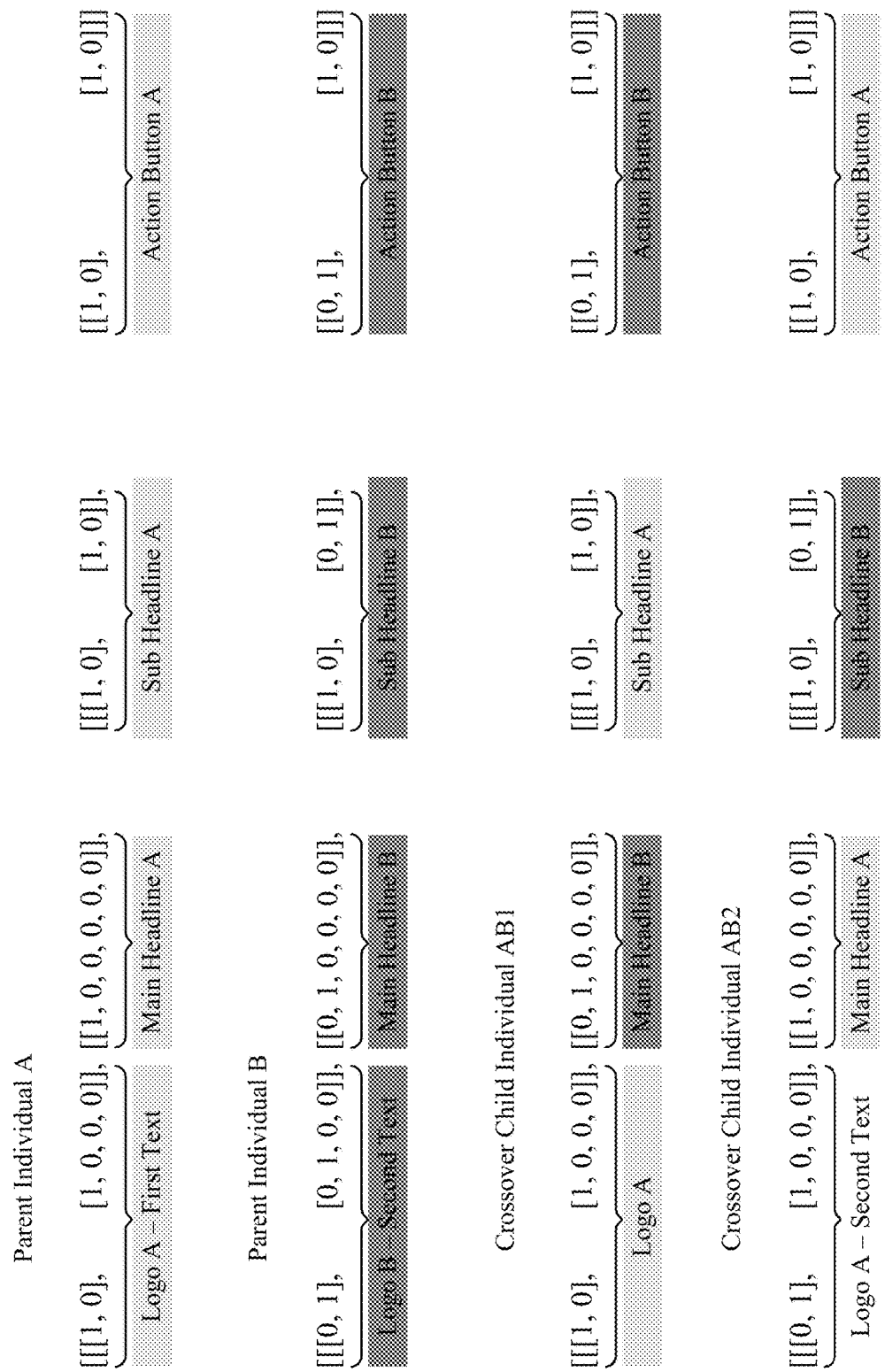
FIG. 11 shows a symbolic drawing of one implementation of procreating new candidate individuals using a crossover technique.

FIG. 11 shows a symbolic drawing of one implementation of procreating new candidate individuals using a crossover technique. In FIG. 11, a binary sequence of parent candidate individual A represents logo A with first text type (e.g., Times Roman), main headline A, sub headline A, and action button A. Also in FIG. 11, a binary sequence of parent candidate individual B represents logo B with second text type (e.g., Arial), main headline B, sub headline B, and action button B. In one exemplary implementation, the procreation module 228 creates a crossover child individual AB1 that includes logo A and sub headline A from parent candidate individual A, and includes main headline B and action button B from parent candidate individual B. In another exemplary implementation, the procreation module 228 creates a crossover child candidate individual AB2 that includes logo A (from parent candidate individual A) with second text type (e.g., Arial) (from parent candidate individual B) and sub headline B from parent individual B, and also includes main headline A and action button A also from parent candidate individual A.

Mutation

Figure 12:
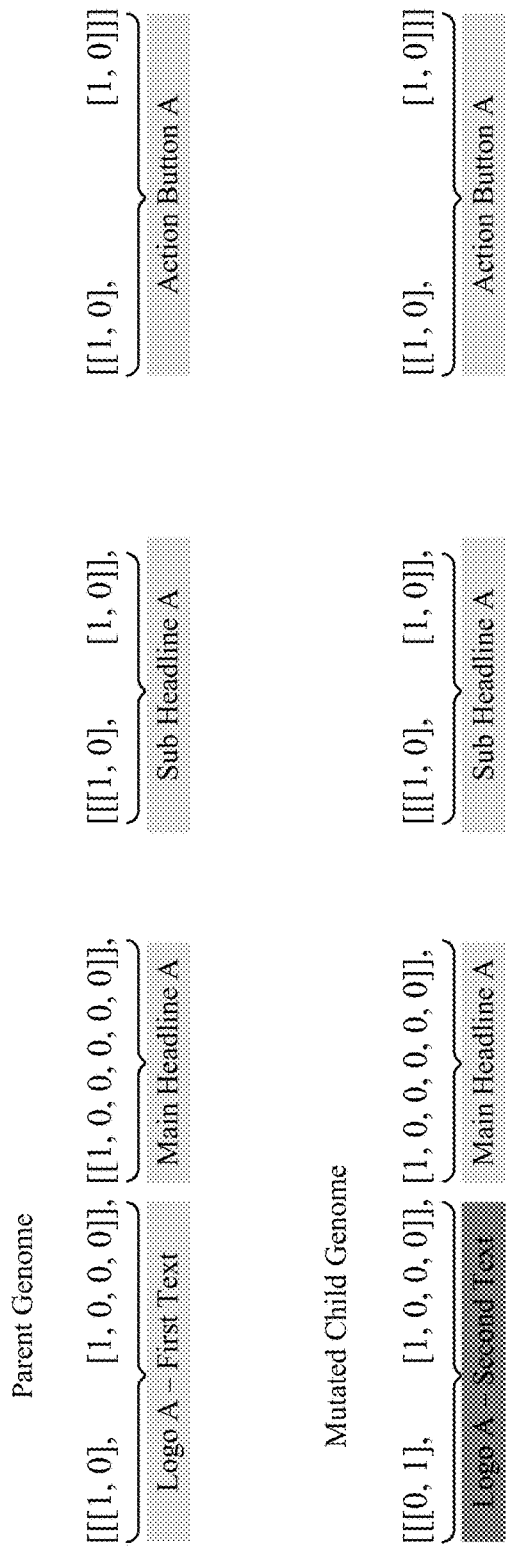
FIG. 12 is a symbolic drawing of one implementation of procreating candidate individuals using a mutation technique.

FIG. 12 is a symbolic drawing of one implementation of procreating candidate individuals using a mutation technique. In FIG. 12, a first gene of a parent genome is mutated such that text type of logo A is mutated from a first text (e.g., Times Roman) to a second text (e.g., Arial).

Preferably, procreation involves crossover to create a small predetermined number of new individuals followed by mutation of only a small subset of the new individuals. Mutation does not increase the number of candidate individuals in this implementation; it merely modifies individuals that were created by crossover.

The evolutionary computations disclosed herein use mutation to avoid or overcome local maxima. Accordingly, in some implementations, the evolutionary computations disclosed herein are configured to carry out mutation only after carrying out crossover in a certain number of generations and/or after carrying out crossover in a certain number of procreation operations within the same generation (e.g., mutation occurs only after the third generation). In other implementations, procreation (e.g., crossover and/or mutation) can be initiated at any other generations, such as the first, second, third, fourth, or tenth generation, and so on.

In implementations, each parent genome is assigned a genome mutation probability that determines the likelihood of a parent genome being subjected to mutation at all during a generation. The "genome mutation probability" can be based on any probability scheme such as random probability, uniform probability, weighted probability, and/or fitness-proportionate probability. When a parent genome is selected, the mutation occurs on a gene-by-gene basis, according to one implementation. So, in one example, parent genomes can be mutated based on sub-elements 806 and/or sub-element values 808, shown in FIG. 8.

Within a parent genome, the selection of genes and/or gene values for the gene-by-gene mutation can be based on a "gene mutation probability". The gene mutation probability can be based on any probability scheme such as random probability, uniform probability, weighted probability, and/or fitness-proportionate probability. So, for example, a Boolean or binary or vector encoding of a genome (such as the ones shown in FIG. 12) can be mutated on a gene-by-gene basis based on any probability scheme. In other implementations, the mutation at the gene-level can be uniform mutation, non-uniform mutation, boundary mutation, and/or gradient mutation. In yet other implementations, the mutation at the gene-level can be based on any other conventional or future-developed mutation technique.

With the procreation of individuals understood, we now turn to how the evolutionary computations disclosed herein accelerate traversal of the candidate search space using pseudo-evolution.

Accelerated Pseudo-Evolution

Performance efficiency is paramount for effective implementation of MLCO. The evolutionary computations disclosed herein add performance efficiency to the evolutionary process by accelerating traversal of the candidate search space (e.g., small search spaces). As discussed above, the candidate search space identifies all possible combinations of dimensions and dimension values; however only a subset of the combinations is initialized in each generation. Following the example used above, if the candidate search space identifies 640 combinations of dimensions and dimension values, then only 13 combinations are initialized in the first generation. Furthermore, whenever a previously generated combination (i.e., candidate individual or genome) is re-generated during a generation or between generations, it is identified as a duplicate and rejected. An evolutionary event or operation that produces a duplicate is referred to herein as a "collision". Collisions cause performance inefficiencies because the results of the collisions (i.e., duplicates) are rejected and do not advance the evolutionary process.

In one example, a spike in a collision count can occur when a majority of the all possible combinations of dimensions and dimension values have already been generated and the evolutionary operations frequently create duplicates. As a result, it could take substantial time to generate the remaining combinations of dimensions and dimension values. Following the example used above, if 620 of the 640 possible combinations are created over 50 generations, then routine evolution could take another 20-50 generations to create the remaining 20 combinations.

The evolutionary computations disclosed herein solve this technical problem by switching to pseudo-evolution when a collision count reaches a pre-set threshold. In one implementation, the evolutionary computations disclosed herein track which of the all possible combinations of dimensions and dimension values have already been generated (e.g., using an annotation and/or enumeration scheme), and when the collision count reaches the pre-set threshold, they randomly generate only those combinations (i.e., candidate individuals or genomes) that have not been yet generated. Accordingly, the evolutionary process is made to artificially focus only on those combinations that have not been selected or created during any of the preceding generations. This is referred to herein as "pseudo-evolution". Pseudo-evolution accelerates the evolutionary process because it bypasses the routine evolution (e.g., terminates, parallelizes, overrides, or avoids initialization and/or procreation schemes) and creates the remaining combinations in much fewer generations. Following the example used above, if 620 of the 640 possible combinations are created over 50 generations and the collision count reaches a threshold of 10, then the pseudo-evolution can exclusively utilize the next 2 generations to only create the remaining 20 combinations.

Evolution Pseudo Code

The following pseudo code shows one implementation of the evolutionary computations:
```
set_evolution_parameters
create_candidates_generation_1
repeat
  repeat
    test_candidates
  until candidate_spread_is_sufficient or remove_criteria_is_met
  remove_low_performing_candidates
  create_new_candidates
Until performance_is_sufficient or no_more_designs_are_possible
```
The following Extended Backus-Naur Form shows another implementation of the evolutionary computations:
```
genome::=[element_cluster+]
element_cluster::=[element+] element
element::=[action+]
action::=[control, action_value]
action_value::=text|formatting|html|hid|remove|image|
   class|custom
text, formatting, html, image, class, custom::=bit_value
hide, remove::=bit_value
bit_value::=0|1
```

The discussion now turns to how candidate individuals are used to generate funnels and comprising webinterfaces for frontend presentation to the end users.

Frontend Presentation

Figure 13:
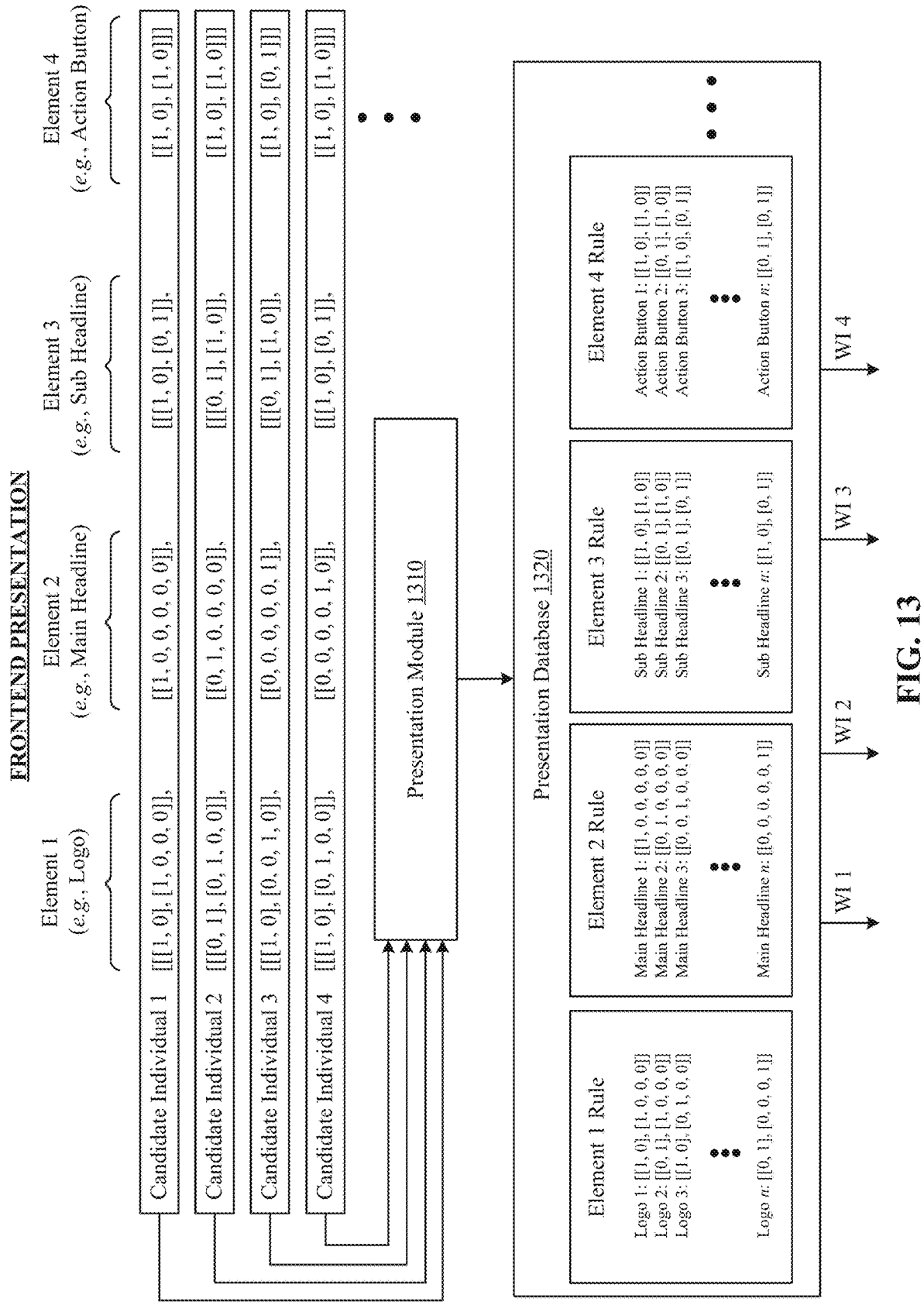
FIGS. 13 and 14 show one implementation of generating funnels of one or more webinterfaces in dependence upon corresponding candidate individuals for frontend presentation to the end users.
Figure 14:
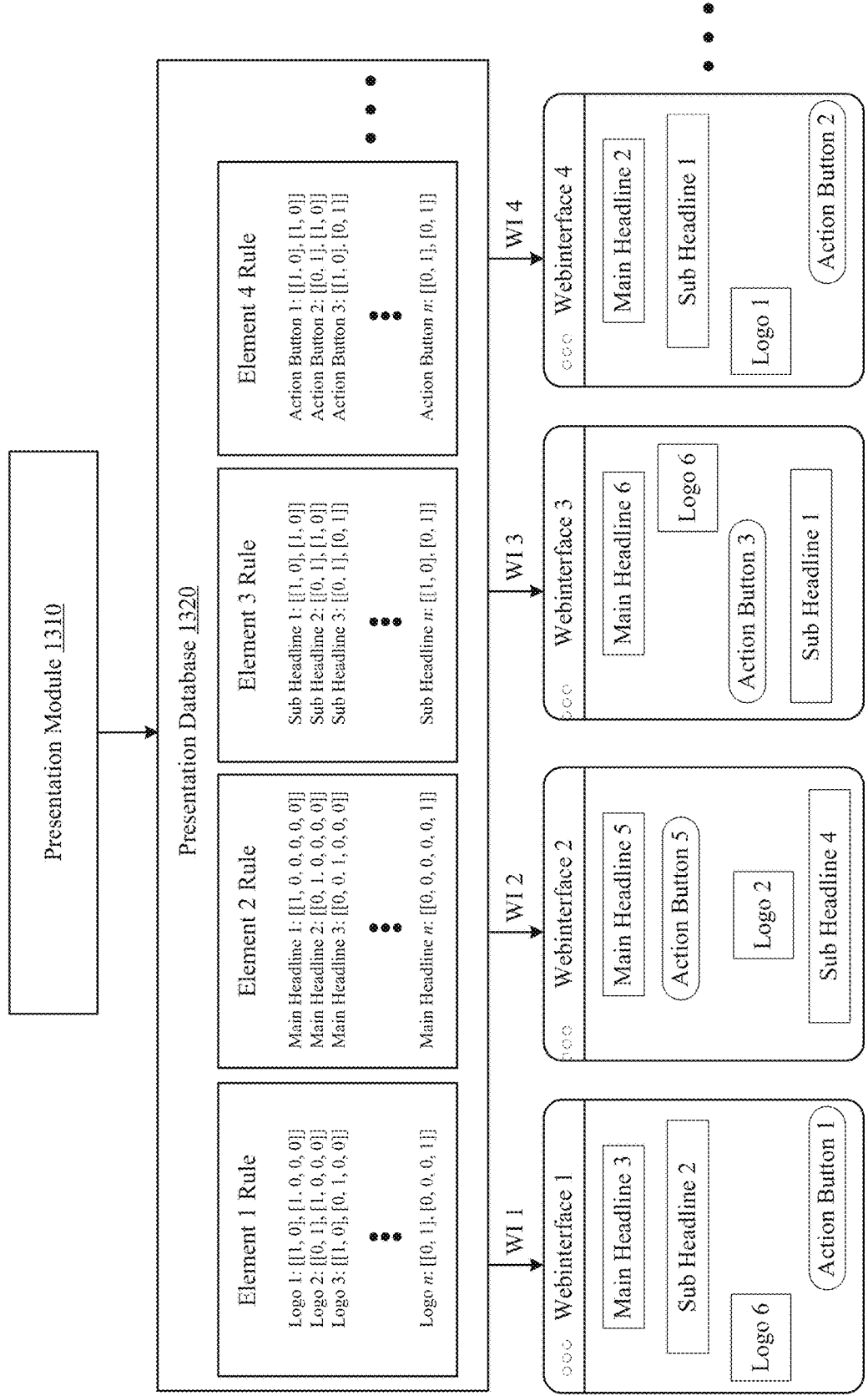

FIGS. 13 and 14 show one implementation of generating funnels of one or more webinterfaces in dependence upon corresponding candidate individuals for frontend presentation to the end users. FIG. 13 shows four candidate individuals (CI 1 to CI 4) based on which four webinterfaces are generated. Individuals (CI 1 to CI 4) can be any candidate individuals in the population 102, i.e., they can be the candidate individuals for whom the performance measures 106 are developed during the live online evaluation 108.

FIG. 13 also shows that each genome is represented by a binary sequence (string). Each binary sequence is further compartmentalized into sub-sequences (sub-strings) referred to herein as "genes". Each gene represents a dimension and corresponding dimension value for a funnel. Accordingly, each gene identifies a sub-element and corresponding sub-element value for the webinterfaces that are to be generated in dependence upon the genomes (CI 1 to CI 4). In implementations where the webinterfaces are frontend (e.g., graphical) objects comprising content, the genes identify frontend (e.g., graphical) elements/components and corresponding element/component values that are to be included in the webinterfaces generated based on the genomes (CI 1 to CI 4).

Note that in the implementation of FIGS. 13 and 14, each element of a funnel is encoded as a fixed-length substring of bits grouped as genes. For example, the sub headline element has four bits grouped into two genes. For each gene, only one of the bits can be active or "hot" (e.g., represented by "1") so as to identify a particular dimension value from a set of available dimension values. The leftmost bit represents the "control" value of a gene, which, in one example, for main headline might indicate "plain text". The second, third, and forth bits might, for example, indicate "bold", "italics", and "bold underlined", respectively. It will be appreciated that many other encodings are possible in different implementations. For example, a 2-bit numeric value might be used, with "0" indicating the control, "1" indicating "bold", "2" indicating "italics", and "3" indicating "bold underlined".

In other implementations of FIGS. 13 and 14, a genome can be represented and comprising elements encoded using other schemes relying on data types other than binary data type (0 or 1), such as quantitative or numerical data type, qualitative data type, discreet data type, continuous data type (with lower and upper bounds), integers data type (with lower and upper bounds), nominal data type, ordinal or ranked data type, categorical data type, interval data type, and/or ratio data type. For example, the encoding of the genomes and the comprising elements in FIGS. 13 and 14 can be based on, or any combination thereof, real values between 0 and 1, continuous values such as Red, Green, Blue (RGB) values between 0 and 256, hexadecimal values of CSS colors (e.g., #F0F8FF), categorical color values of CSS colors (e.g., AliceBlue), respective values of other CSS property groups and properties (such as the ones listed on the web at <http://www.w3schools.com/cssref/#animation>), size of a particular dimension (e.g., height and width), a set of different values and data types (e.g., different numeric dollar price values or a combination of different numeric dollar price values and heights and widths), and others.

The genomes (CI 1 to CI 4) are generated and provided by the conversion system 104 using the disclosed evolutionary computations, as discussed above. The conversion system 104 then utilizes a presentation database 1320 and a presentation module 1310 to transform the genomes (CI 1 to CI 4) into funnels of one or more webinterfaces.

The presentation database 1320 serves as a rule repository that identifies a frontend element value for each of at least one available value of each of the dimensions of the funnel. The presentation module 1310 applies a selected one of the candidate individuals to the presentation database 1320 to determine frontend element values corresponding to dimension values identified by the selected candidate individual. Accordingly, the presentation module 1310 is able to evaluate a genome provided by the conversion system 104 against the presentation database 1320 and generate an appropriate variation of the funnel based on the genome.

Presentation database 1320 includes various element rules. In the presentation database 1320, element rules are provided for all possible dimensions in the candidate search space, i.e., all possible frontend (e.g., graphical) elements/components that can be included in a webinterface. Also, each element rule includes pointers identifying all possible dimension values or page element/component values for a given dimension or page element/component. For example, a "sub headline" element rule includes pointers for all possible properties of the "sub headline" element, such as color, text, size, placement, and the like.

For a selected genome, the presentation module 1310 accesses the presentation database 1320 and evaluates the applicable element rule for each gene in the selected genome. In FIG. 13's example, element 1 rule is identified for all the logo genes, element 2 rule is identified for all the main head line genes, element 3 rule is identified for all the sub headline genes, and element 4 rule is identified for all the action button genes. Further, each element rule identifies a pointer for the respective gene values and generates corresponding frontend (e.g., graphical) elements/components and element/component values.

In one implementation, when one of the available values for each of the dimensions is a default value, the resulting the funnel has a default frontend element value for the default dimension value of each of the dimensions. In such an implementation, the presentation module 1310 applies the selected candidate individual to the presentation database 1320 to determine frontend element values corresponding to all dimension values identified by the selected candidate individual other than the default dimension value for each of the dimensions.

In other implementations, a funnel customization specification memory is utilized, which stores, for a particular variation of the webinterface funnel, a value for each of the dimensions of the funnel. In such an implementation, the presentation module 1310 presents toward a user a funnel having frontend element values indicated by the presentation database 1320 as corresponding to the dimension values stored in the funnel customization specification memory. The funnel customization specification memory is also updated with a new set of values for each of the dimensions of the funnel. Updated values for the funnel customization specification memory are retrieved in response to user behavior for entering the funnel (e.g., user providing a landing page URL via a browser). In addition, the presentation module 1310 accesses the presentation database 1320 in response to user behavior (e.g., user providing a landing page URL via a browser).

In one implementation, when one of the available values for each of the dimensions is a default value, the funnel has a default frontend element value for the default dimension value of each of the dimensions. In such an implementation, the funnel presented toward the user by the presentation module 1310 has frontend element values indicated by the presentation database 1320 as corresponding to all of the dimension values identified in the funnel customization specification memory other than the default dimension value for each of the dimensions.

In FIG. 14, four webinterfaces (WI 1 to WI 4) are generated by the presentation module 1310 in dependence upon each of the candidate individuals (CI 1 to CI 4). Each of the webinterfaces include frontend (e.g., graphical) elements/components and element/component values identified by the rules in the presentation database 1320. Then, the webinterfaces (WI 1 to WI 4) are presented to the users for the live online evaluation 108.

Machine Learned User Device (MLUD)

Figure 15:
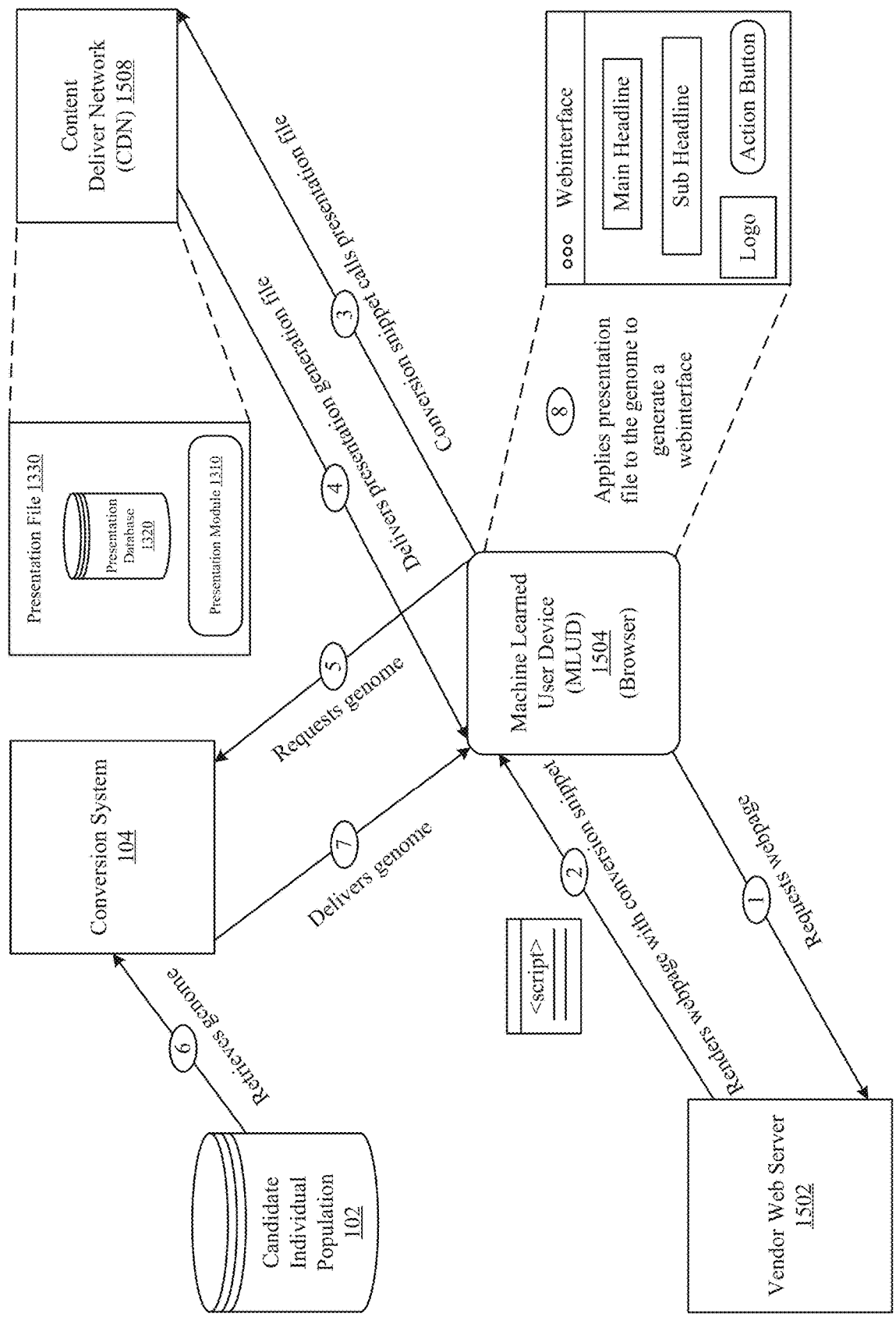
FIG. 15 is one implementation of a machine learned user device (MLUD).

FIG. 15 illustrates one implementation of an improved user device, referred to herein as the "machine learned user device" (MLUD). In FIG. 15, an end user uses a browser running on a MLUD 1504 to access a vendor website. The vendor web server is configured to deploy a conversion snippet, as part of a webpage, to the MLUD 1504 in response to the end user accessing the vendor website. After the conversion snippet is sent to the MLUD 1504 and before the webpage is rendered to the end user, the conversion snippet invokes a network server infrastructure. The network server infrastructure includes the conversion system 104, the candidate individual population 102, and a content delivery network (CDN) 1508.

The conversion snippet, deployed at the MLUD 1504, retrieves a presentation file 1330 from the CDN 1508 and stores the presentation file 1330 at the MLUD 1504. The CDN 1508 is pre-loaded with the presentation file 1330. Examples of common CDN services today include Akamai™, CloudFlare™, CloudFront™, Fastly™, MaxCDN™, KeyCDN™ Incapsula™, and GlobalDots™. The presentation file 1330 includes the presentation database 1320 and the presentation module 1310, discussed above.

Then, the conversion snippet, deployed at the MLUD 1504, requests a genome from the conversion system 104. In response, the conversion system 104 retrieves a genome from the candidate individual population 102 and delivers the selected genome to the MLUD 1504.

Then, the MLUD 1504, having received the selected genome from the conversion system 104 and the presentation file 1330 from the CDN 1508, executes the presentation module 1310. The presentation module 1310 evaluates the selected genome against the rules of the presentation database 1320 and generates a funnel of one or more webinterfaces, as discussed above. Accordingly, a standard user device is improved to generate algorithmically evolved webinterfaces.

Machine Learned Content Delivery Network (MLCDN)

Figure 16:
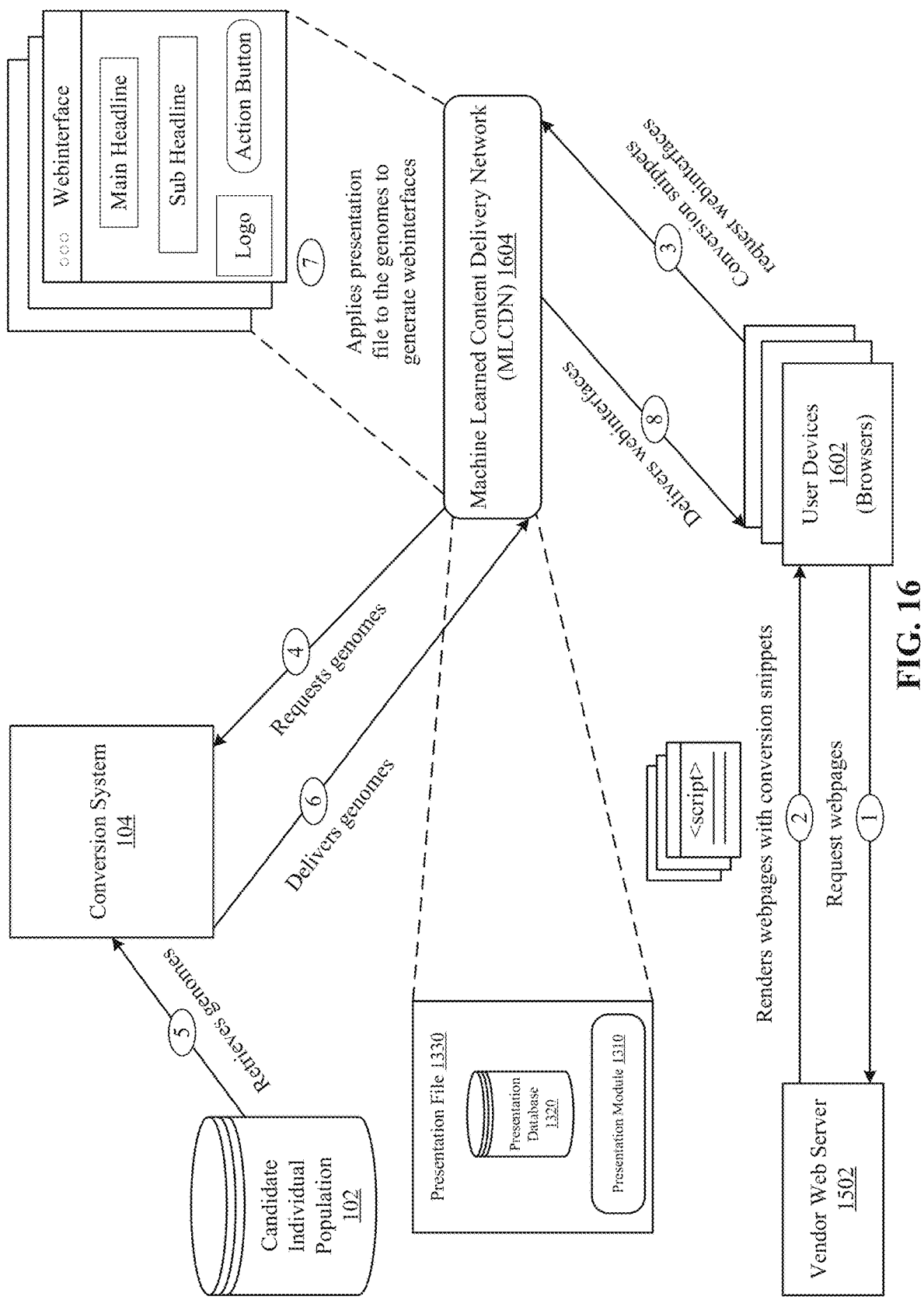
FIG. 16 illustrates one implementation of a machine learned content delivery network (MLCDN).

FIG. 16 illustrates one implementation of an improved content delivery network (CDN), referred to herein as the "machine learned content delivery network" (MLCDN). In FIG. 16, end users use browsers running on user devices 1602 to access a vendor website. The vendor web server is configured to deploy a conversion snippet, as part of a webpage, to the user devices 1602 in response to the end users accessing the vendor website. After the conversion snippet is sent to the user devices 1602 and before the webpage is rendered to the end users, the conversion snippet invokes a network server infrastructure. The network server infrastructure includes the conversion system 104, the candidate individual population 102, and a MLCDN 1604.

The MLCDN 1604 is pre-loaded with the presentation file 1330. The presentation file 1330 includes the presentation database 1320 and the presentation module 1310, discussed above.

Then, the MLCDN 1604 requests a genome from the conversion system 104. In response, the conversion system 104 retrieves a genome from the candidate individual population 102 and delivers the selected genome to the MLCDN 1604.

Then, the MLCDN 1604, having both the selected genome and the presentation file 1330, executes the presentation module 1310. The presentation module 1310 evaluates the selected genome against the rules of the presentation database 1320 and generates a funnel of one or more webinterfaces, as discussed above. The MLCDN 1604 then delivers the webinterfaces to the user devices 1602 for frontend presentation to the end users. Accordingly, a standard CDN is improved to generate algorithmically evolved webinterfaces.

Example Results

During the live online evaluation 108, the performance measures 106 are gathered for each of the funnels based on user interaction 324. In some implementations, the interaction metadata can be tracked for each user on a session-by-session basis. For example, for each of the interacting users like user_m, user_j, user (j+1), and user_n, corresponding sessions interaction_im, interaction_ij, interaction i(j+1), and interaction_in can be created during the live online evaluation 108. During these sessions, funnels corresponding to candidate individuals like individual_i, individual_i+1, and individual_n can be presented to the users and evaluated in parallel. Based on the user interaction 324, the performance measures 106 for each of the candidate individuals can be collected and developed.

Figure 17:
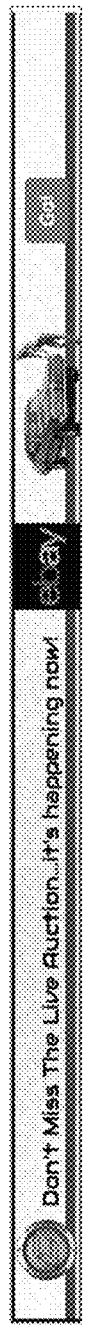
FIG. 17 graphically illustrates a control individual and a winning individual, and comprising dimensions and dimension values.
Figure 17:
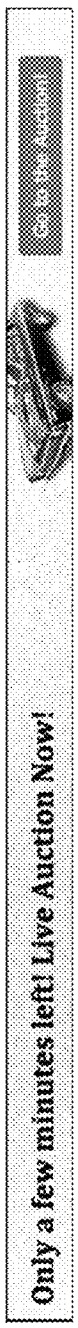

FIG. 17 graphically illustrates a control individual and a winning individual, and comprising dimensions and dimension values. In the example shown in FIG. 17, the best performing winning headline page element is shown along with the control banner.

Figure 18:
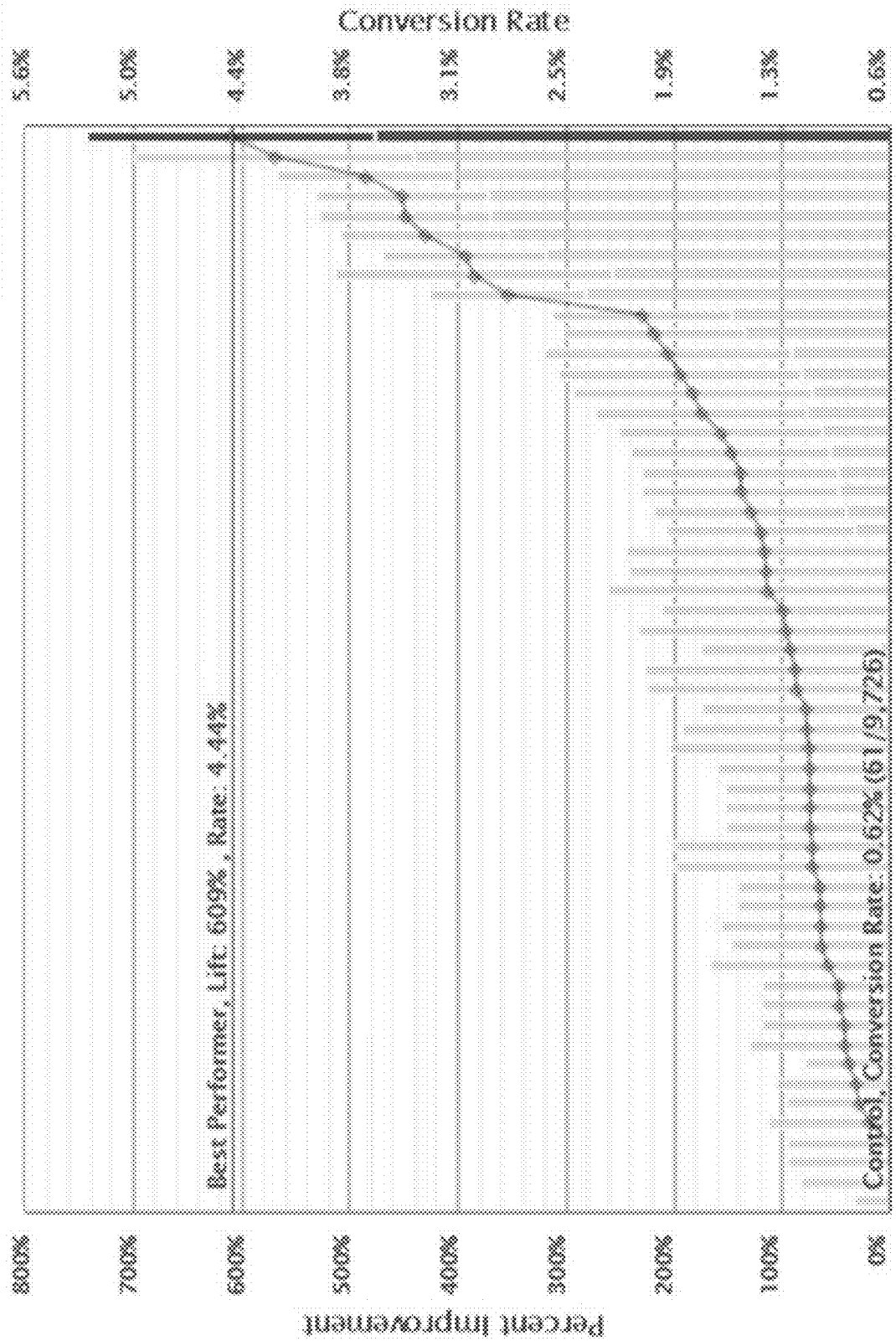
FIG. 18 is a chart that graphically illustrates example results of one implementation of the disclosed evolutionary computations.

FIG. 18 is a chart that graphically illustrates example results of one implementation of the disclosed evolutionary computations carrying out the MLCO. In FIG. 18, the chart shows that the best performing winning headline page element of FIG. 17 can improve the conversion rate from nearly 0% to 4.44%.

Risk Tolerance & Population Segmentation

Figure 19:
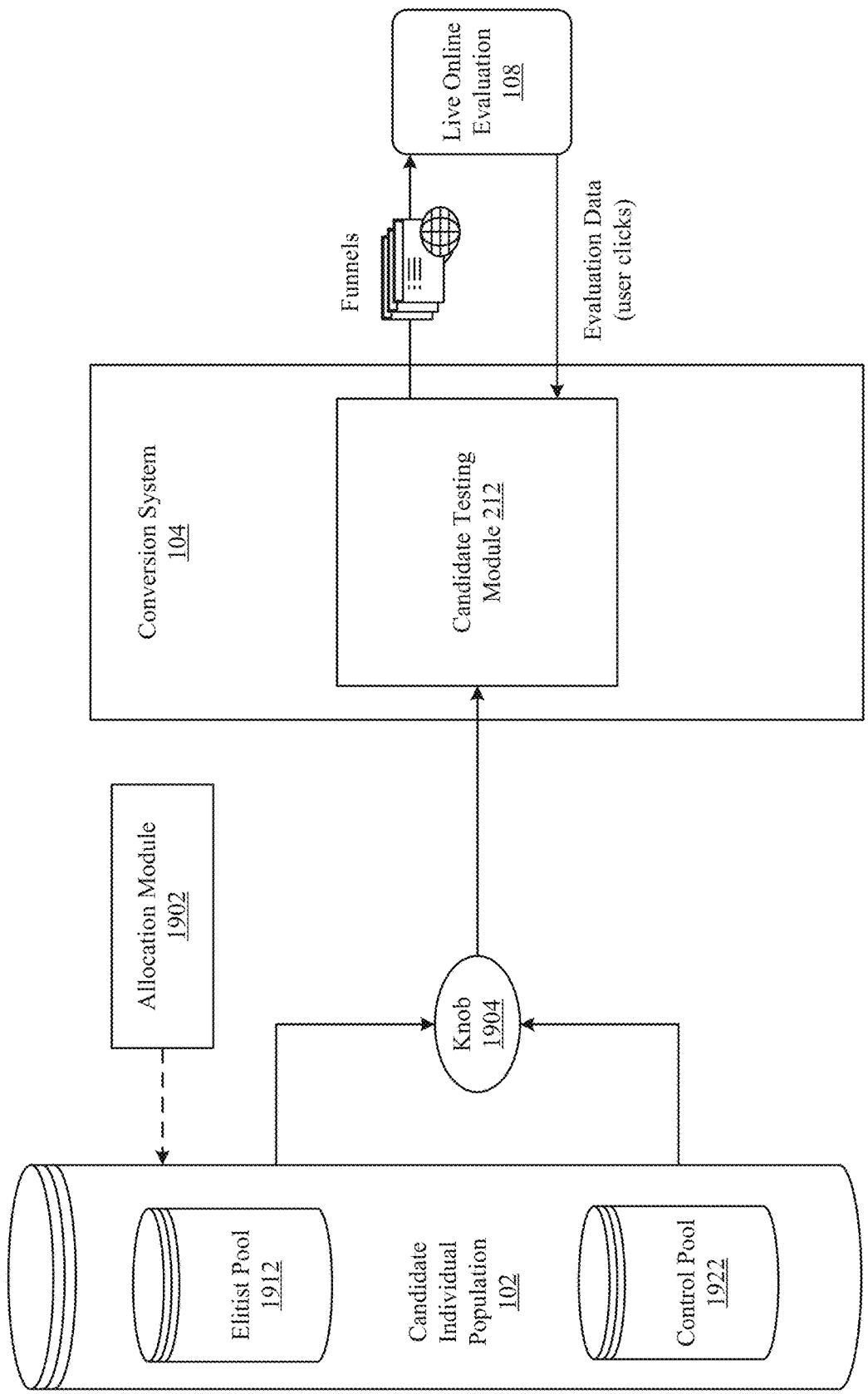
FIG. 19 shows one implementation of a risk tolerance module that implements risk tolerance for the disclosed evolutionary computations and an allocation module that segments the candidate population.

Existing conversion optimization solutions, which involve live testing on real users, sometimes are cancelled in the very early stages when they cause conversions to drop. The risk and returns of conversion optimization are "inversely related". As a result, the MLCO disclosed herein provides systems and methods of increasing conversions within the scope of the desired risk tolerance. FIG. 19 shows one implementation of a risk tolerance module that implements risk tolerance for the disclosed evolutionary computations. In the example shown in FIG. 19, the risk tolerance module is depicted in the form of a knob 1904 that can serve as a configurable parameter accessible across an administrative interface.

In one implementation, a risk tolerance level is specified that determines what percentage or amount of the live user traffic (i.e., what number of users) is presented algorithmically evolved funnels or candidate individuals and what percentage or amount of the live user traffic (i.e., what number of users) is presented control funnels or candidate individuals. For example, at a conservative risk tolerance level, only 5% of the webpages served to the user are determined by the evolutionary computations, whereas 95% of the webpages are control versions. In other implementations, different risk tolerance levels can be specified such as moderately conservative (e.g., 15% evolved webpages, 85% control webpages), moderate (e.g., 20% evolved webpages, 80% control webpages), moderately aggressive (e.g., 60% evolved webpages, 40% control webpages), and aggressive (e.g., 70% evolved webpages, 30% control webpages). For each of these risk tolerance levels, appropriate division of user exposure to algorithmically evolved candidate individuals and control candidate individuals can be set.

In one implementation, candidate individuals in the candidate individual population 102 can be segmented by an allocation module 1902 into multiple groups or pools in dependence upon a plurality of heuristics. Examples of such heuristics include how good a candidate individual is based on the performance measures (e.g., conversion rate or revenue rate), how experienced a candidate individual is based on the degree of live user evaluation or how recently a candidate individual was created or how many generations a candidate individual has survived or the number of times a candidate individual has been preserved due to being selected into the elitist pool, or whether the candidate individual is a control individual based on designer specification.

In one implementation, a first population group within the candidate population comprises only of control individuals, a second population group with the candidate population comprises only of elite individuals, a third population within the candidate population comprises only of non-elite pre-existing individuals (i.e., formed in a previous generation), and a fourth population within the candidate population comprises only of newly formed individuals (i.e., formed in a current generation).

Depending on the configuration of the knob 1904, frequency of alternative deployment of candidate individuals from an elitist pool 1912 and a control pool 1922 can be set. For example, if the knob 1904 is set at 20%, then the conversion system 104 accesses and deploys candidate individuals from the control pool 1922 80% of the time. In other implementations, different access frequency rules can be set that will be readily apparent to those skilled in the art.

Additionally, the live user traffic can be allocated to various groups or pools of the candidate population by the candidate testing module 212 working in conjunction with the knob 1904. In one example, 50% of the live user traffic can be assigned to control individuals in a control pool, 30% of the liver user traffic can be assigned to elite individuals in an elite pool (e.g., the fittest members of the previous generation and preserved into the next generation), and 20% of the live user traffic can be assigned to non-elite individuals (e.g., recently created offspring genomes) in a non-elite pool. Furthermore, varied distribution of the live user traffic across different segments of the candidate population can be used by organizations to implement risk tolerance schemes. For instance, since elite individuals are superior to control individuals, an aggressive risk tolerance scheme can include routing a majority of the live user traffic to elite individuals in the elite pool and routing only minority of the live user traffic to the control pool and the non-elite pool. For example, 60% of the live user traffic can be assigned to the elite pool, 20% of the liver user traffic can be assigned to the control pool, and 20% of the live user traffic can be assigned to the non-elite pool. With such a scheme, because more users will be exposed to elite webinterfaces, the organizational performance measures (e.g., organizational conversion rate or organizational revenue rate) improve faster.

Similarly, in other implementations, conservative or semi-aggressive or semi-conservative schemes can be selected and/or implemented by the organizations.

In yet other implementations, different heuristics can be used to segment the candidate population (e.g., weighted probability, region, domain name, department within an organization, etc.), such that the live user traffic can be variedly distributed to the different segments, groups, pools, or clusters of the candidate population defined by the heuristics.

Computer System

Figure 20:
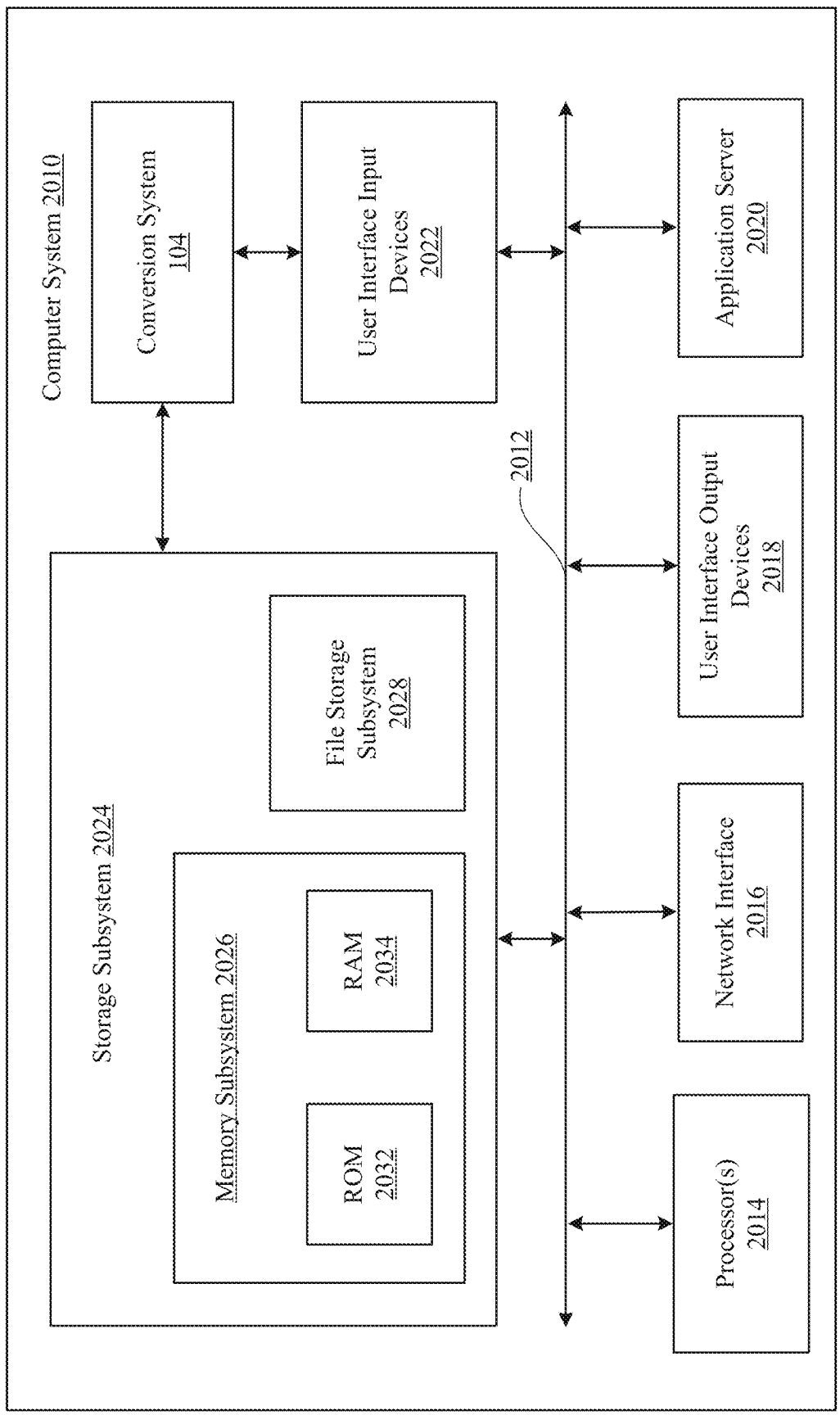
FIG. 20 is a simplified block diagram of a computer system that can be used to implement the technology disclosed.

FIG. 20 is a simplified block diagram of a computer system that can be used to implement the technology disclosed. Computer system 2010 typically includes at least one processor 2014 that communicates with a number of peripheral devices via bus subsystem 2012. These peripheral devices can include a storage subsystem 2024 including, for example, memory devices and a file storage subsystem, user interface input devices 2022, user interface output devices 2018, and a network interface subsystem 2016. The input and output devices allow user interaction with computer system 2010. Network interface subsystem 2016 provides an interface to outside networks, including an interface to corresponding interface devices in other computer systems.

In one implementation, the conversion system 104 is communicably linked to the storage subsystem 2024 and a user interface input devices 2022.

User interface input devices 2022 or clients or client devices can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2010.

User interface output devices 2018 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2010 to the user or to another machine or computer system.

Storage subsystem 2024 stores programming and data constructs that provide the functionality of some or all of the modules and methods described herein. These software modules are generally executed by processor 2014 alone or in combination with other processors.

Memory 2026 used in the storage subsystem can include a number of memories including a main random access memory (RAM) 2034 for storage of instructions and data during program execution and a read only memory (ROM) 2032 in which fixed instructions are stored. A file storage subsystem 2028 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2028 in the storage subsystem 2024, or in other machines accessible by the processor.

Bus subsystem 2012 provides a mechanism for letting the various components and subsystems of computer system 2010 communicate with each other as intended. Although bus subsystem 2012 is shown schematically as a single bus, alternative implementations of the bus subsystem can use multiple busses. Application server 2020 can be a framework that allows the applications of computer system 2010 to run, such as the hardware and/or software, e.g., the operating system.

Computer system 2010 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2010 depicted in FIG. 20 is intended only as a specific example for purposes of illustrating the preferred embodiments of the present invention. Many other configurations of computer system 2010 are possible having more or less components than the computer system depicted in FIG. 20.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A computer-implemented webinterface production and deployment system, comprising:
    a memory storing a candidate database having a population of candidate individuals, each of the candidate individuals identifying a funnel of one or more webinterfaces, each of the webinterfaces having a plurality of elements including a logo, a main headline, a sub headline, and a call-to-action, each element in the plurality of elements having a plurality of dimensions along which a non-graphical value can be specified;
    a presentation database which identifies a frontend element value for each of at least one available non-graphical value of each of the dimensions of the plurality of elements including the logo, the main headline, the sub headline, and the call-to-action, wherein the presentation database is a rule repository with element rules, with each element rule including pointers identifying one-to-one mappings between N preset non-graphical dimension values and each of the dimensions of the plurality of elements including the logo, the main headline, the sub headline, and the call-to-action, where N>1; and
    a presentation module that converts the dimensions of the plurality of elements including the logo, the main headline, the sub headline, and the call-to-action into the frontend element values based on the one-to-one mappings by applying a selected one of the candidate individuals to the presentation database to determine frontend element values corresponding to non-graphical dimension values identified by the selected candidate individual, and which presents toward a user a funnel having the determined frontend element values.

2. The system of claim 1, wherein one of the available values for each of the dimensions is a default value, wherein the funnel has a default frontend element value for the default dimension value of each of the dimensions, and wherein the presentation module applies the selected candidate individual to the presentation database to determine frontend element values corresponding to all dimension values identified by the selected candidate individual other than the default dimension value for each of the dimensions.

3. A computer-implemented deployment system for a customizable webinterface funnel, the funnel being customizable along a plurality of dimensions, comprising:

a presentation database which identifies a frontend element value for each of at least one available non-graphical value of each of the dimensions of a plurality of elements of a webinterface including a logo, a main headline, a sub headline, and a call-to-action, wherein the presentation database is a rule repository with element rules, with each element rule including pointers identifying one-to-one mappings between N preset non-graphical dimension values and each of the dimensions of the plurality of elements including the logo, the main headline, the sub headline, and the call-to-action funnel, where N>1;

a funnel customization specification memory storing, for a particular variation of the webinterface funnel, a non-graphical value for each of the dimensions of the plurality of elements including the logo, the main headline, the sub headline, and the call-to-action; and a presentation module that converts the dimensions of the plurality of elements including the logo, the main headline, the sub headline, and the call-to-action into the frontend element values based on the one-to-one mappings and presents toward a user a funnel having frontend element values indicated by the presentation database as corresponding to the non-graphical dimension values stored in the funnel customization specification memory.

4. The system of claim 3, wherein one of the available values for each of the dimensions is a default value, wherein the funnel has a default frontend element value for the default dimension value of each of the dimensions, and wherein the funnel presented toward the user by the presentation module has frontend element values indicated by the presentation database as corresponding to all of the dimension values identified in the funnel customization specification memory other than the default dimension value for each of the dimensions.

5. The system of claim 3, further configured to update the funnel customization specification memory with a new set of values for each of the dimensions of the funnel.

6. The system of claim 3, wherein the system retrieves the values for the funnel customization specification memory in response to user behavior for entering the funnel.

7. The system of claim 6, wherein the system also retrieves the presentation database in response to user behavior.

8. A computer-implemented webinterface production and deployment system, comprising:

a memory storing a database having a population of candidate individuals, each of the candidate individuals identifying a funnel of one or more webinterfaces, each of the webinterfaces having a plurality of elements including a logo, a main headline, a sub headline, and a call-to-action, each element in the plurality of elements having a plurality of dimensions along which a non-graphical value can be specified; and network server infrastructure which, in response to one or more first requests received over a network, returns toward a first client computer system:

a presentation database which identifies a frontend element value for each of at least one available non-graphical value of each of the dimensions of the plurality of elements including the logo, the main headline, the sub headline, and the call-to-action, wherein the presentation database is a rule repository with element rules, with each element rule including pointers identifying one-to-one mappings between N preset non-graphical dimension values and each of the dimensions of the plurality of elements including the logo, the main headline, the sub headline, and the call-to-action, where N>1, a set of non-graphical dimension values identified by a first selected one of the candidate individuals in the population, and a presentation module which, in dependence upon the received set of non-graphical dimension values of the dimensions of the plurality of elements including the logo, the main headline, the sub headline, and the call-to-action, presents toward a user a funnel having frontend element values indicated by the received set of dimension values by converting the received set of non-graphical dimension values into the frontend element values based on the one-to-one mappings.

9. The system of claim 8, wherein one of the available values for each of the dimensions is a default value, wherein the funnel has a default frontend element value for the default dimension value of each of the dimensions, and wherein the presentation module applies the first selected candidate individual to the presentation database to determine frontend element values corresponding to all dimension values identified by the first selected candidate individual other than the default dimension value for each of the dimensions.

10. The system of claim 8, wherein the network server infrastructure, in response to one or more second requests received over a network, returns toward a second client computer system:

the presentation database;

the presentation module; and the set of dimension values identified by a second selected one of the candidate individuals in the population.

11. The system of claim 8, wherein a webinterface represents a webpage.

12. The system of claim 8, wherein a webinterface represents a mobile application.

13. The system of claim 8, wherein a webinterface represents an e-mail.

14. The system of claim 8, wherein a webinterface represents a social media message.

15. The system of claim 8, wherein a webinterface represents a social media feed item.

16. The system of claim 8, wherein a webinterface represents a chat message.

17. The system of claim 8, wherein the population of candidate individuals in the database comprises candidate individuals being tested for their success in promoting predetermined target user behavior, the system further comprising:

a population initialization module which writes a preliminary pool of candidate individuals into the candidate individual population;

a candidate testing module that tests each of the candidate individuals in the candidate individual population by live online evaluation, the candidate testing module developing a performance measure for each of the candidate individuals undergoing live online evaluation, the performance measure being an indicator of success of the funnel in achieving the target user behavior;

a procreation module which adds to the candidate individual population new candidate individuals formed in dependence upon a respective set of one or more parent candidate individuals from the candidate individual population and the parents' performance measures; and a control module that iterates the candidate testing module and the procreation module, wherein the candidate testing module is included in the network server infrastructure and selects from the candidate individual population the selected candidate individuals whose dimension values are to be returned toward client computer systems in response to the requests.

18. The system of claim 17, wherein the target user behavior is conversion by users.

19. The system of claim 17, wherein the performance measure developed by the candidate testing module is based on conversion rates of the candidate individuals undergoing the live online evaluation.

20. The system of claim 17, wherein the performance measure developed by the candidate testing module is based on revenue received from the candidate individuals undergoing the live online evaluation.

21. The system of claim 8, wherein the network server infrastructure comprises:

a content delivery network (CDN) which, in response to a request from the client computer system, returns the presentation database and the presentation module toward the client computer system; and a conversion system which retrieves the first selected candidate individual from the database and, in response to a request from the client computer system, returns toward the client computer system the set of dimension values identified by the first selected candidate individual.

22. A computer-implemented webinterface production and deployment system, comprising:

a memory storing a candidate database having a population of candidate individuals, each of the candidate individuals identifying a funnel of one or more webinterfaces, each of the webinterfaces having a plurality of elements including a logo, a main headline, a sub headline, and a call-to-action, each element in the plurality of elements having a plurality of dimensions along which a non-graphical value can be specified; and a machine learned content delivery network having accessibly thereto a presentation database which identifies a frontend element value for each of at least one available non-graphical value of each of the dimensions of the plurality of elements including the logo, the main headline, the sub headline, and the call-to-action funnel, the machine learned content delivery network being configured to, in response to a request from a client computer system, wherein the presentation database is a rule repository with element rules, with each element rule including pointers identifying one-to-one mappings between N preset non-graphical dimension values and each of the dimensions of the plurality of elements including the logo, the main headline, the sub headline, and the call-to-action, where N>1:

retrieve from the database a selected one of the candidate individuals in the population, and delivers toward the client computer system a funnel having frontend element values indicated by the non-graphical dimension values of the selected candidate individual values by converting the non-graphical dimension values into the frontend element values based on the one-to-one mappings.

23. The system of claim 22, wherein the machine learned content delivery network prepares the funnel in response to the request from a client computer system.

24. The system of claim 22, further comprising a conversion system having access to the database, wherein the machine learned content delivery network, in retrieving the selected candidate individual, is configured further to request a candidate individual from the conversion system, and wherein the conversion system is configured to select the selected candidate individual in response to a request from the machine learned content delivery network, and to return the selected candidate individual toward the machine learned content delivery network.

25. The system of claim 24, wherein the population of candidate individuals in the database comprises candidate individuals being tested for their success in promoting predetermined target user behavior, and wherein the conversion system comprises:

a population initialization module which writes a preliminary pool of candidate individuals into the candidate individual population;

a candidate testing module that tests each of the candidate individuals in the candidate individual population by live online evaluation, the candidate testing module developing a performance measure for each of the candidate individuals undergoing live online evaluation, the performance measure being an indicator of success of the funnel in achieving the target user behavior;

a procreation module which adds to the candidate individual population new candidate individuals formed in dependence upon a respective set of one or more parent candidate individuals from the candidate individual population and the parents' performance measures; and a control module that iterates the candidate testing module and the procreation module, wherein in selecting the selected candidate individual, the candidate testing module selects the selected candidate individual from the candidate individual population.

26. A computer-implemented webinterface production and deployment method, comprising:

providing a memory storing a candidate database having a population of candidate individuals, each of the candidate individuals identifying a funnel of one or more webinterfaces, each of the webinterfaces having a plurality of elements including a logo, a main headline, a sub headline, and a call-to-action, each element in the plurality of elements having a plurality of dimensions along which a non-graphical value can be specified;

providing a presentation database which identifies a frontend element value for each of at least one available non-graphical value of each of the dimensions of the plurality of elements including the logo, the main headline, the sub headline, and the call-to-action, wherein the presentation database is a rule repository with element rules, with each element rule including pointers identifying one-to-one mappings between N preset non-graphical dimension values and each of the dimensions of the plurality of elements including the logo, the main headline, the sub headline, and the call-to-action, where N>1;

applying a selected one of the candidate individuals to the presentation database to determine frontend element values corresponding to non-graphical dimension values identified by the selected candidate individual by converting the non-graphical dimension values into the frontend element values based on the one-to-one mappings; and presenting toward a user a funnel having the determined frontend element values.

* * * * *